(12) United States Patent
Lin

(10) Patent No.: US 11,508,182 B2
(45) Date of Patent: Nov. 22, 2022

(54) ELECTRONIC CIRCUIT HAVING FINGERPRINT SENSING FUNCTION AND METHOD FOR SENSING FINGERPRINT IMAGE

(71) Applicant: Novatek Microelectronics Corp., Hsinchu (TW)

(72) Inventor: Wu-Wei Lin, Taoyuan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 17/569,466

(22) Filed: Jan. 5, 2022

(65) Prior Publication Data

US 2022/0130168 A1 Apr. 28, 2022

Related U.S. Application Data

(63) Continuation of application No. 17/015,026, filed on Sep. 8, 2020, now Pat. No. 11,281,883.

(60) Provisional application No. 62/903,952, filed on Sep. 23, 2019.

(51) Int. Cl.
*G06V 40/12* (2022.01)
(52) U.S. Cl.
CPC ................. *G06V 40/1335* (2022.01)
(58) Field of Classification Search
None
See application file for complete search history.

(56) References Cited

U.S. PATENT DOCUMENTS

| 10,809,831 | B2 | 10/2020 | Tsai et al. | |
|---|---|---|---|---|
| 2015/0102207 | A1* | 4/2015 | Kurokawa | H01L 27/14612 257/53 |
| 2017/0046558 | A1* | 2/2017 | Li | G06F 3/0412 |
| 2017/0140201 | A1* | 5/2017 | Li | G06V 40/13 |
| 2018/0101271 | A1 | 4/2018 | Tsai et al. | |
| 2019/0266379 | A1 | 8/2019 | Huang et al. | |
| 2021/0004107 | A1 | 1/2021 | Tsai et al. | |

FOREIGN PATENT DOCUMENTS

| CN | 107918756 | 4/2018 |
|---|---|---|
| TW | 201911006 | 3/2019 |
| TW | 201915649 | 4/2019 |

OTHER PUBLICATIONS

"Notice of allowance of Taiwan Counterpart Application", dated Apr. 29, 2022, p. 1-p. 3.

* cited by examiner

*Primary Examiner* — Nicholas J Lee
(74) *Attorney, Agent, or Firm* — JCIPRNET

(57) ABSTRACT

An electronic circuit adapted to drive a panel including a plurality of fingerprint sensing zones is provided. The electronic circuit includes a fingerprint sensing circuit. The fingerprint sensing circuit is configured to determine at least two fingerprint sensing zones to perform a fingerprint sensing operation according to a touch area and receive a fingerprint sensing signal corresponding to fingerprint sensing data from the at least two fingerprint sensing zones. The fingerprint sensing circuit rearranges the fingerprint sensing data from the at least two fingerprint sensing zones. In addition, an electronic device and a method for sensing a fingerprint image are also provided.

28 Claims, 26 Drawing Sheets

ELECTRONIC CIRCUIT HAVING FINGERPRINT SENSING FUNCTION AND METHOD FOR SENSING FINGERPRINT IMAGE

CROSS-REFERENCE TO RELATED APPLICATION

This application is a continuation application of and claims the priority benefit of U.S. patent application Ser. No. 17/015,026, filed on Sep. 8, 2020, now allowed. The prior U.S. patent application Ser. No. 17/015,026 claims the priority benefit of U.S. Provisional application Ser. No. 62/903,952, filed on Sep. 23, 2019. The entirety of each of the above-mentioned patent applications is hereby incorporated by reference herein and made a part of this specification.

BACKGROUND

Technical Field

The invention relates to an electronic circuit, an electronic device and a sensing method, more specifically, to an electronic circuit and an electronic device adapted to drive a panel including fingerprint sensors, and a method for sensing a fingerprint image.

Description of Related Art

In recent years, demands for fingerprint sensing have been gradually increased. In order to reduce a volume of an electronic device, a fingerprint sensing region may overlap with a display region of the electronic device. For example, an under-display fingerprint identification technique is to embed fingerprint sensors to a display panel, and the fingerprint sensor may sense or capture a fingerprint image through the display panel. When a touch event such as fingerprint identification happens, a touch sensing circuit may report it to an application processor of the electronic device via a specified interface. Next, the application processor further controls a display driving circuit to drive the display panel, and thus the display panel displays an interface for fingerprint sensing. On the other hand, the application processor further controls a fingerprint sensing circuit to perform the fingerprint sensing operation. The fingerprint sensing circuit transmits sensing information to the application processor for fingerprint identification after the fingerprint sensing operation, and then the application processor completes the fingerprint identification according to the sensing information.

In related art, the display panel may be divided into a plurality of fingerprint sensing zones including fingerprint sensors for fingerprint sensing. However, how to design an optimal size of the fingerprint sensing zone is an important issue. If the size of the fingerprint sensing zone is too small, it means the display panel includes too many fingerprint sensing zones, and the fingerprint sensing circuit may spend more time for receiving the sensing signal. If the size of the fingerprint sensing zone is too large, it means the display panel includes too few fingerprint sensing zones, and the fingerprint sensing circuit may have some problems to determine a scanning zone for fingerprint sensing.

SUMMARY

The invention is directed to an electronic circuit and an electronic device, capable of providing an efficient method for fingerprint sensing and identification and good user experience for users. In addition, a method for sensing a fingerprint image adapted to the electronic circuit is also provided.

An embodiment of the invention provides an electronic circuit adapted to drive a panel including a plurality of fingerprint sensing zones. The electronic circuit includes a fingerprint sensing circuit. The fingerprint sensing circuit is configured to determine at least two fingerprint sensing zones to perform a fingerprint sensing operation according to a touch area and receive a fingerprint sensing signal corresponding to fingerprint sensing data from the at least two fingerprint sensing zones. The fingerprint sensing circuit rearranges the fingerprint sensing data from the at least two fingerprint sensing zones.

An embodiment of the invention provides an electronic device including a panel and an electronic circuit. The panel includes a plurality of fingerprint sensing zones. The electronic circuit is coupled to the panel. The electronic circuit is adapted to determine at least two fingerprint sensing zones to perform a fingerprint sensing operation according to a touch area and receive a fingerprint sensing signal corresponding to fingerprint sensing data from the at least two fingerprint sensing zones. The electronic circuit rearranges the fingerprint sensing data from the at least two fingerprint sensing zones.

An embodiment of the invention provides a method for sensing a fingerprint image. The method is adapted to a panel including a plurality of fingerprint sensing zones. The method includes: determining at least two fingerprint sensing zones to perform a fingerprint sensing operation according to a touch area, and receiving a fingerprint sensing signal corresponding to fingerprint sensing data from the at least two fingerprint sensing zones; and rearranging the fingerprint sensing data from the at least two fingerprint sensing zones.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Embodiments are provided below to describe the disclosure in detail, though the disclosure is not limited to the provided embodiments, and the provided embodiments can be suitably combined. The term "coupling/coupled" or "connecting/connected" used in this specification (including claims) of the application may refer to any direct or indirect connection means. For example, "a first device is coupled to a second device" should be interpreted as "the first device is directly connected to the second device" or "the first device is indirectly connected to the second device through other devices or connection means." In addition, the term "signal" can refer to a current, a voltage, a charge, a temperature, data, electromagnetic wave or any one or multiple signals.

Figure 1:
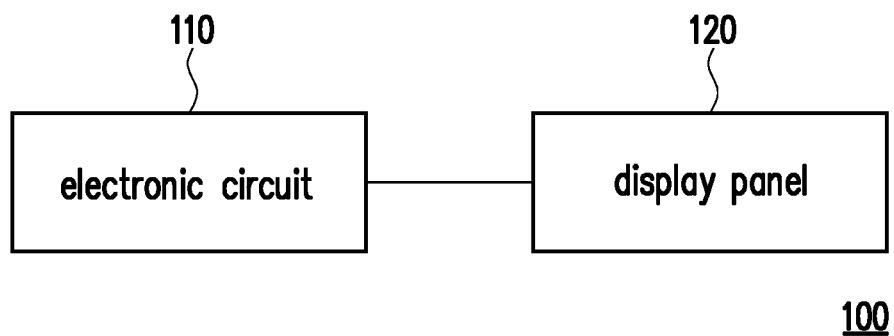
FIG. 1 is a schematic block diagram illustrating an electronic device according to an embodiment of the invention.

FIG. 1 is a schematic block diagram illustrating an electronic device according to an embodiment of the invention. Referring to FIG. 1, the electronic device 100 of the present embodiment includes an electronic circuit 110 and a display panel 120. The display panel 120 includes touch sensors and fingerprint sensors. The electronic circuit 110 is adapted to drive the display panel 120.

In the present embodiment, the electronic device 100 may be an electronic device having a display function, a touch sensing function and a fingerprint sensing function. In an embodiment, the electronic device 100 may be, but not limited to, a smartphone, a non-smart phone, a wearable electronic device, a tablet computer, a personal digital assistant, a notebook and other portable electronic devices that can operate independently and have the display function, the touch sensing function and the fingerprint sensing function. In an embodiment, the electronic device 100 may be, but not limited to, a portable or un-portable electronic device in a vehicle intelligent system. In an embodiment, the electronic device 100 may be, but not limited to, intelligent home appliances such as, a television, a computer, a refrigerator, a washing machine, a telephone, an induction cooker, a table lamp and so on.

Figure 2:
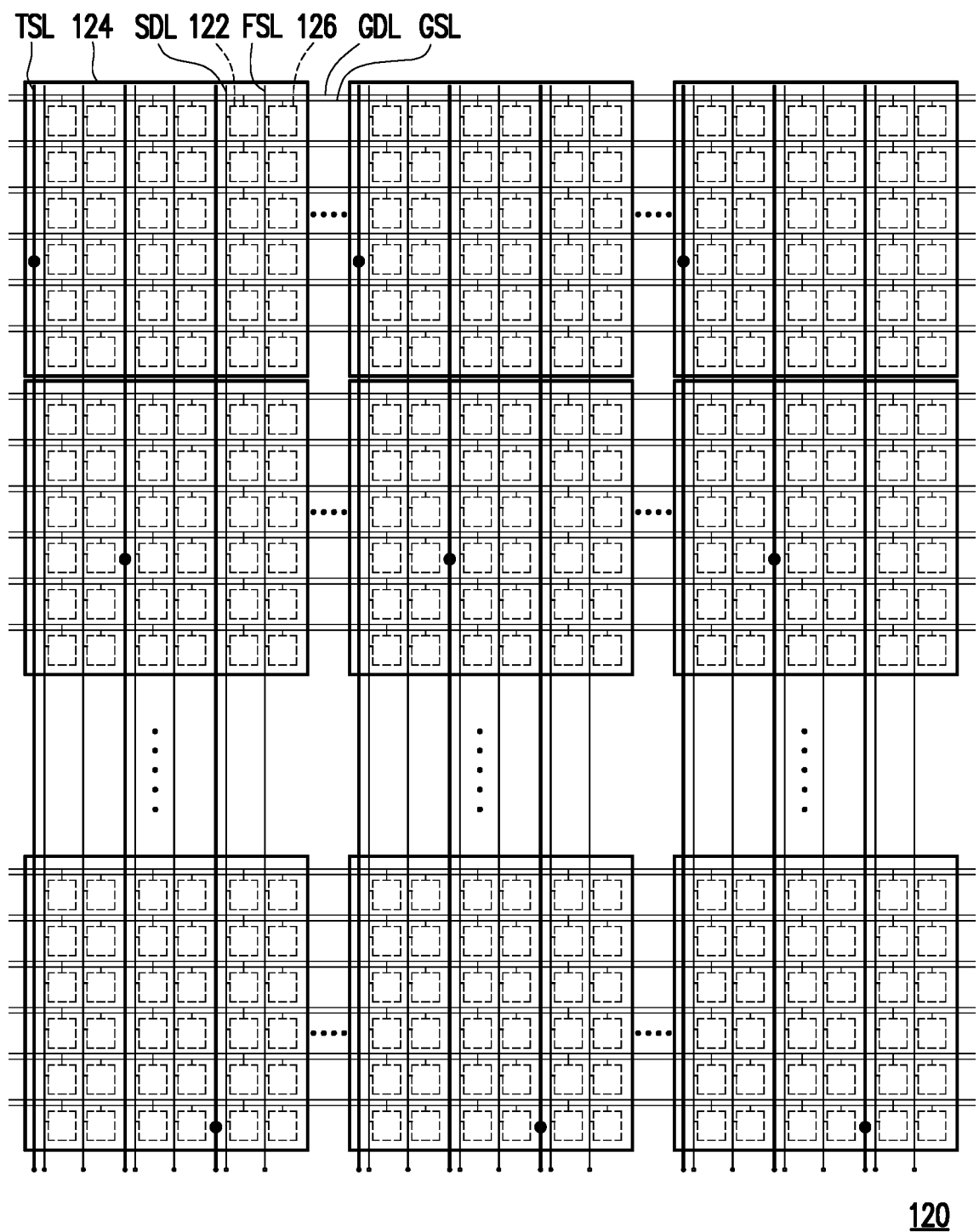
FIG. 2 is a schematic diagram illustrating the display panel depicted in FIG. 1.

FIG. 2 is a schematic diagram illustrating the display panel depicted in FIG. 1. Referring to FIG. 2, the display panel 120 of the present embodiment includes a plurality of display pixels 122, the display panel 120 of the present embodiment includes a plurality of display pixels 122, a plurality of touch sensors 124 and a plurality of fingerprint sensors 126. The electronic circuit 110 drives and controls the display panel 120 to perform a display operation, a touch sensing operation and a fingerprint sensing operation. To be specific, the electronic circuit 110 drives and controls the display pixels 122 to display images via display scan lines GDL and display data lines SDL. The electronic circuit 110 also drives and controls the touch sensors 124 to sense a touch event of the display panel 120 via touch scan lines and touch sensing lines TSL. In an embodiment, the touch sensors 124 may be touch sensing electrodes in a touch sensing phase, and the touch sensors 124 may be common electrodes in a display phase. In the present embodiment, in-cell touch sensors are depicted in FIG. 2 as an example. For the in-cell touch sensors, the display panel 120 inherently has no touch scan lines. For other type touch sensors, the display panel 120 may have touch scan lines for transmitting touch driving signals. The electronic circuit 110 also drives and controls the fingerprint sensors 126 to sense a fingerprint image on the display panel 120 via fingerprint scan lines GSL and fingerprint sensing lines FSL.

In an embodiment, the display panel 120 may be an in-cell fingerprint, touch and display panel that the fingerprint sensors and the touch sensors are embedded, but the invention is not limited thereto. In an embodiment, the electronic circuit 110 may drive and control the electronic device 100 to perform an in-display fingerprint identification operation. In an embodiment, the fingerprint sensors 126 may be optical fingerprint sensors.

Figure 3:
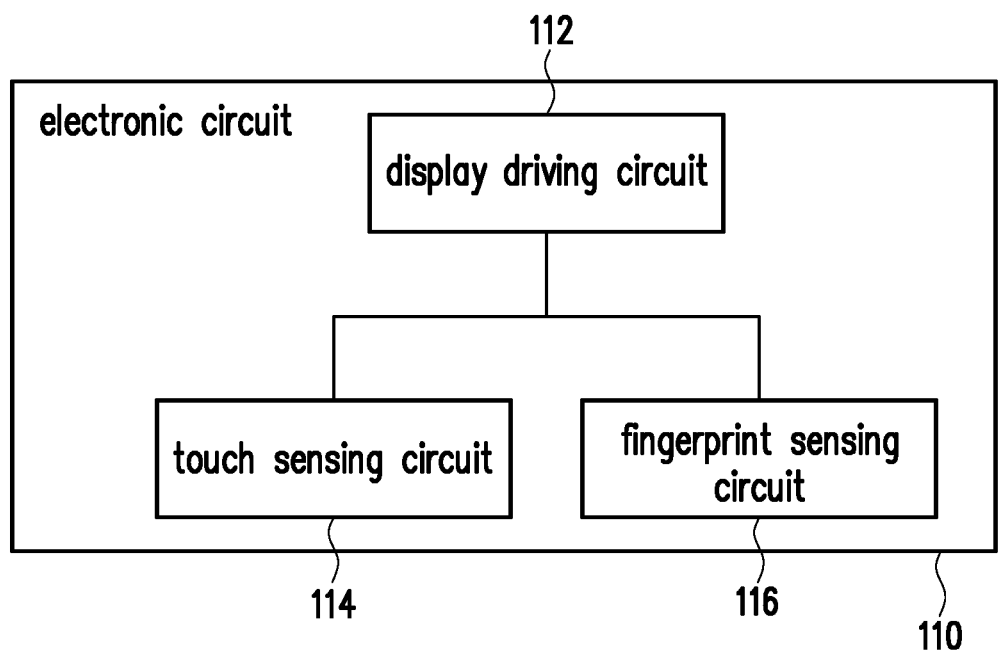
FIG. 3 is a schematic block diagram illustrating the electronic circuit depicted in FIG. 1.

FIG. 3 is a schematic block diagram illustrating the electronic circuit 110 depicted in FIG. 1. Referring to FIG. 3, the electronic circuit 110 may include a display driving circuit 112, a touch sensing circuit 114 and a fingerprint sensing circuit 116. The display driving circuit 112 is configured to drive and control the display pixels 122 to display images via the display scan lines GDL and the display data lines SDL. The display driving circuit 112 may include a timing controller, a display driver and other functional circuits for the display operation. The touch sensing circuit 114 is configured to drive and control the touch sensors 124 to sense the touch event of the display panel 120 via the touch sensing lines TSL. The touch sensing circuit 114 may include a touch controller, an analog front end (AFE) circuit, an analog-to-digital converter (ADC) circuit and other functional circuits for the touch sensing operation. The fingerprint sensing circuit 116 is configured to drive and control the fingerprint sensors 126 to sense the fingerprint on the display panel 120 via the fingerprint scan lines GSL and the fingerprint sensing lines FSL. The fingerprint sensing circuit 116 may include a digital circuit, an AFE circuit, an ADC circuit and other functional circuits for the fingerprint sensing operation.

The display driving circuit 112, the touch sensing circuit 114 and the fingerprint sensing circuit 116 communicate with one another via signal transmission interfaces, such as Mobile Industry Processor Interface (MIPI), Inter-Integrated Circuit (I2C) Interface, Serial Peripheral Interface (SPI) and/or other similar or suitable interfaces.

In an embodiment, the display driving circuit 112, the touch sensing circuit 114 and the fingerprint sensing circuit 116 may be formed in a single semiconductor chip or different semiconductor chips. For example, the display driving circuit 112, the touch sensing circuit 114 and the fingerprint sensing circuit 116 may be formed in a single semiconductor chip that can drive and control the display panel 120 to perform the display operation, the touch sensing operation and the fingerprint sensing operation. For another example, the display driving circuit 112 and the touch sensing circuit 114 may be formed in a first semiconductor chip that can drive and control the display panel 120 to perform the display operation and the touch sensing operation, and the fingerprint sensing circuit 116 may be formed in a second semiconductor chip which is different from the first semiconductor chip. The second semiconductor chip can drive and control the display panel 120 to perform the fingerprint sensing operation. For another example, the display driving circuit 112, the touch sensing circuit 114 and the fingerprint sensing circuit 116 may be formed in different semiconductor chips that can drive and control the display panel 120 to perform the display operation, the touch sensing operation and the fingerprint sensing operation, respectively.

Figure 4:
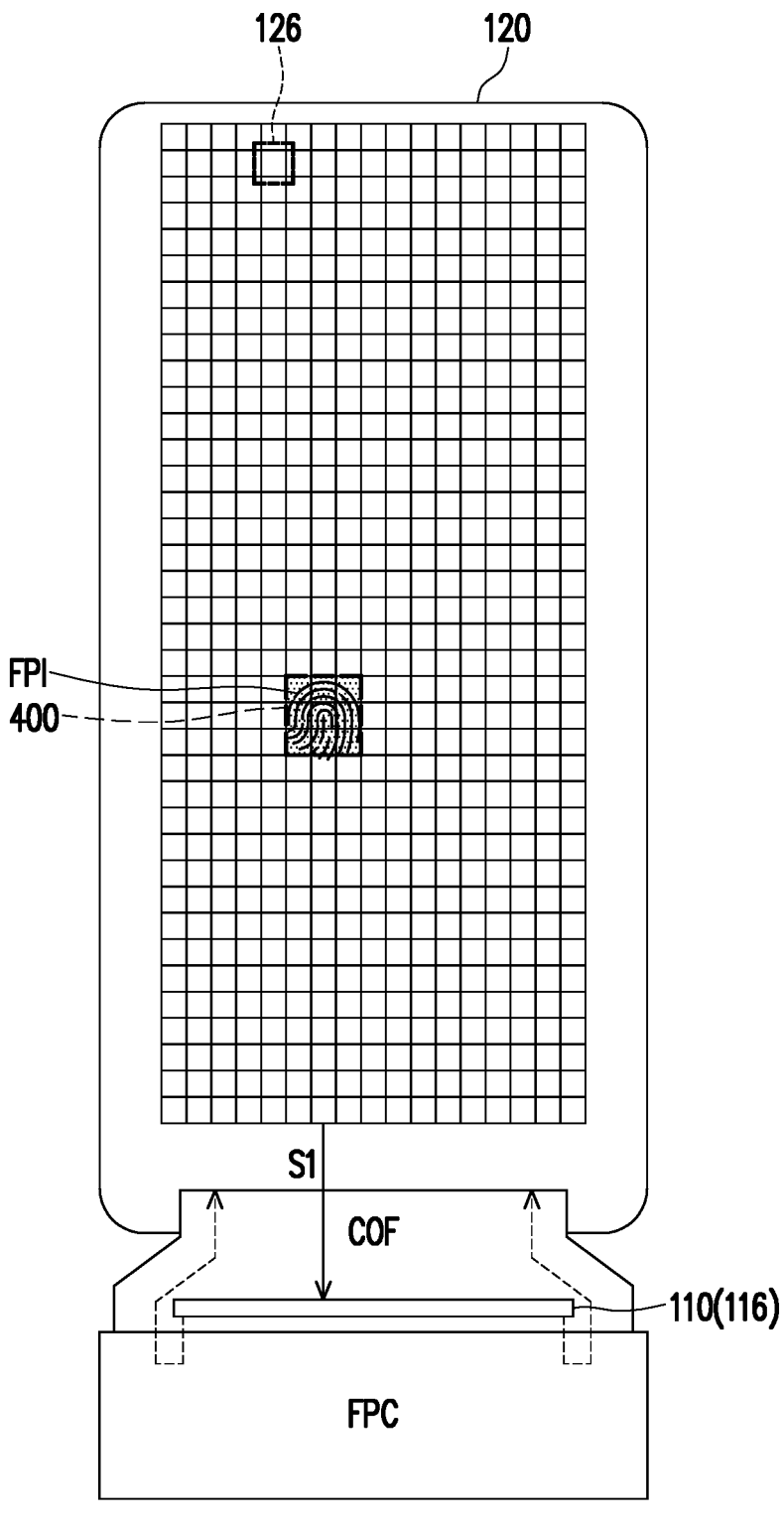
FIG. 4 is a schematic diagram illustrating an electronic device according to another embodiment of the invention.
Figure 5A:
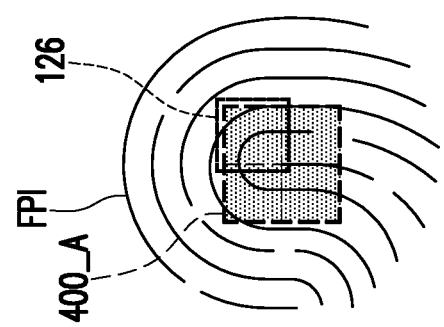
FIG. 5A, FIG. 5B, FIG. 5C and FIG. 5D respectively illustrate fingerprint sensing zones of different sizes according to embodiments of the invention.
Figure 5B:
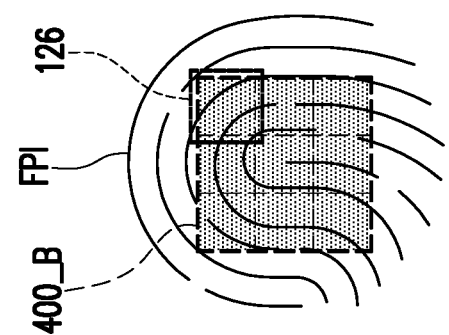
Figure 5C:
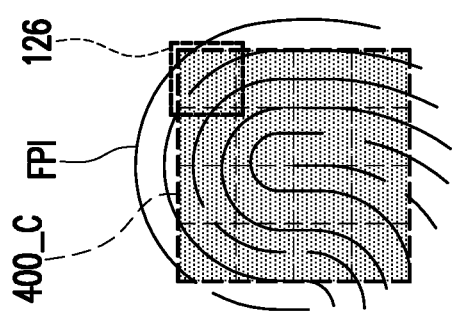
Figure 5D:
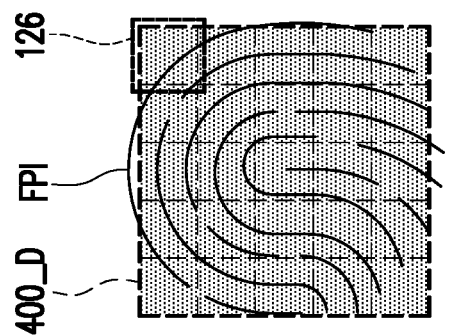

FIG. 4 is a schematic diagram illustrating an electronic device according to an embodiment of the invention. Referring to FIG. 4, the electronic device 100 includes an electronic circuit 110 and a display panel 120. The electronic circuit 110 is configurable to be coupled to the display panel 120. The electronic circuit 110 may be connected to the display panel 120 in a manner of chip on film, but the invention is not limited thereto. The marks COF and FPC in FIG. 4 respectively indicate "chip on film" and "flexible printed circuit".

The display panel 120 includes a plurality of fingerprint sensors 126. Some fingerprint sensors 126 form a fingerprint sensing zone 400 for sensing a fingerprint image FPI. In the present embodiment, the resolution of the touch sensors is substantially the same as the resolution of the fingerprint sensing zones 400. The touch sensors are not illustrated in FIG. 4 but can be referred to FIG. 2. In addition, taking FIG. 2 for example, if the size of the fingerprint sensing zone of the display panel 120 is determined to be substantially the same as the size of the touch sensor 124, it means the resolution of the touch sensors is substantially the same as the resolution of the fingerprint sensing zones.

The electronic circuit 110 is adapted to determine at least one fingerprint sensing zone 400 to perform the fingerprint sensing operation and receive fingerprint sensing signal S1 corresponding to fingerprint sensing data from the determined fingerprint sensing zone 400. The electronic circuit 110 may be a read out integrated circuit (ROIC) to read out the fingerprint sensing data from the fingerprint sensing zone 400. The electronic circuit 110 serving as the ROIC may include the fingerprint sensing circuit 116 as depicted in FIG. 3 to perform the fingerprint sensing operation. The fingerprint sensing circuit 116 is configured to drive and control the fingerprint sensing zone 400 to sense the fingerprint image FPI on the display panel 120. In an embodiment, the electronic circuit 110 may further include the display driving circuit 112 and/or the touch sensing circuit 114 as depicted in FIG. 3 to perform the display operation and/or the touch sensing operation.

FIG. 5A, FIG. 5B, FIG. 5C and FIG. 5D respectively illustrate fingerprint sensing zones of different sizes according to embodiments of the invention. Referring to FIG. 5A to FIG. 5D, the fingerprint sensing zone 400_A includes 4 fingerprint sensors 126 arranged in a 2×2 array in FIG. 5A. The fingerprint sensing zone 400_B includes 9 fingerprint sensors 126 arranged in a 3×3 array in FIG. 5B. The fingerprint sensing zone 400_C includes 16 fingerprint sensors 126 arranged in a 4×4 array in FIG. 5C. The fingerprint sensing zone 400_D includes 25 fingerprint sensors 126 arranged in a 5×5 array in FIG. 5D. In the present embodiment, the fingerprint sensing zone 400_A, 400_B, 400_C or 400_D senses at least a portion of the fingerprint image FPI including sufficient fingerprint features for fingerprint identification. The size of the fingerprint sensing zone can be determined according to user requirement. The size of the fingerprint sensing zone do not intend to limit the invention. In other embodiments, the fingerprint sensing zone may include fingerprint sensors arranged in a 2×1, 3×2, 3×1, 4×3, 4×2 or 4×1 array.

Figure 6A:
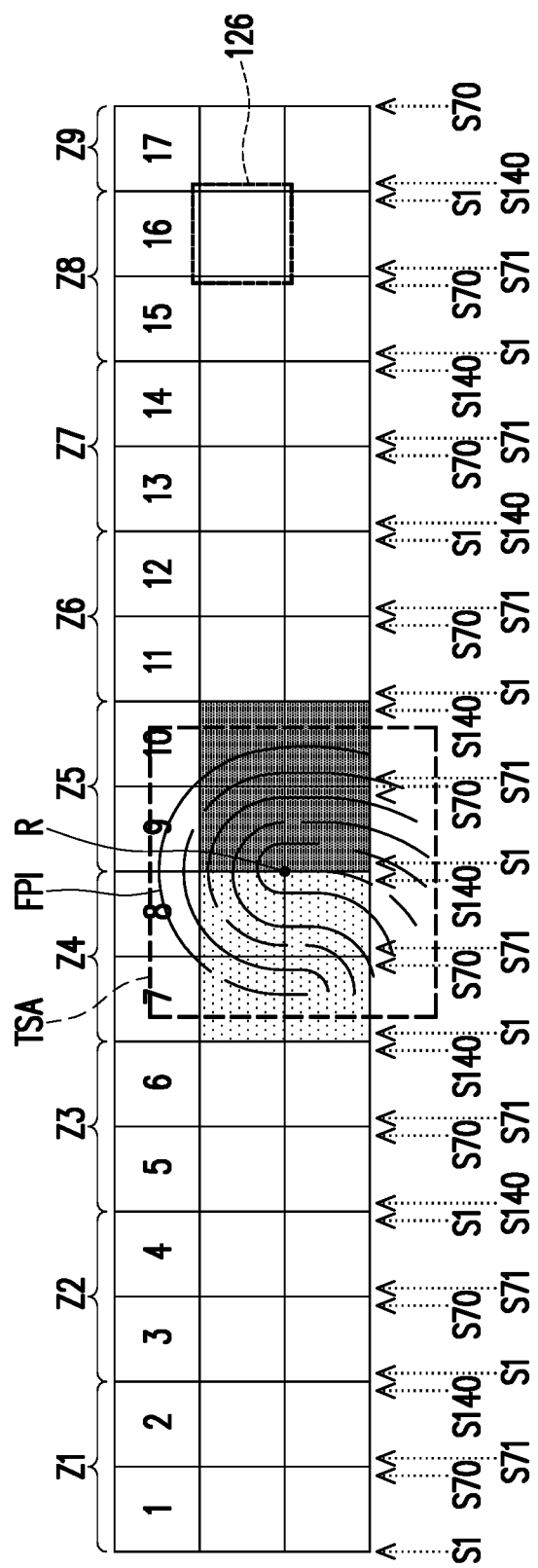
FIG. 6A illustrates some fingerprint sensing zones of the display panel are determined to sense the fingerprint image according to an embodiment of the invention.
Figure 6B:
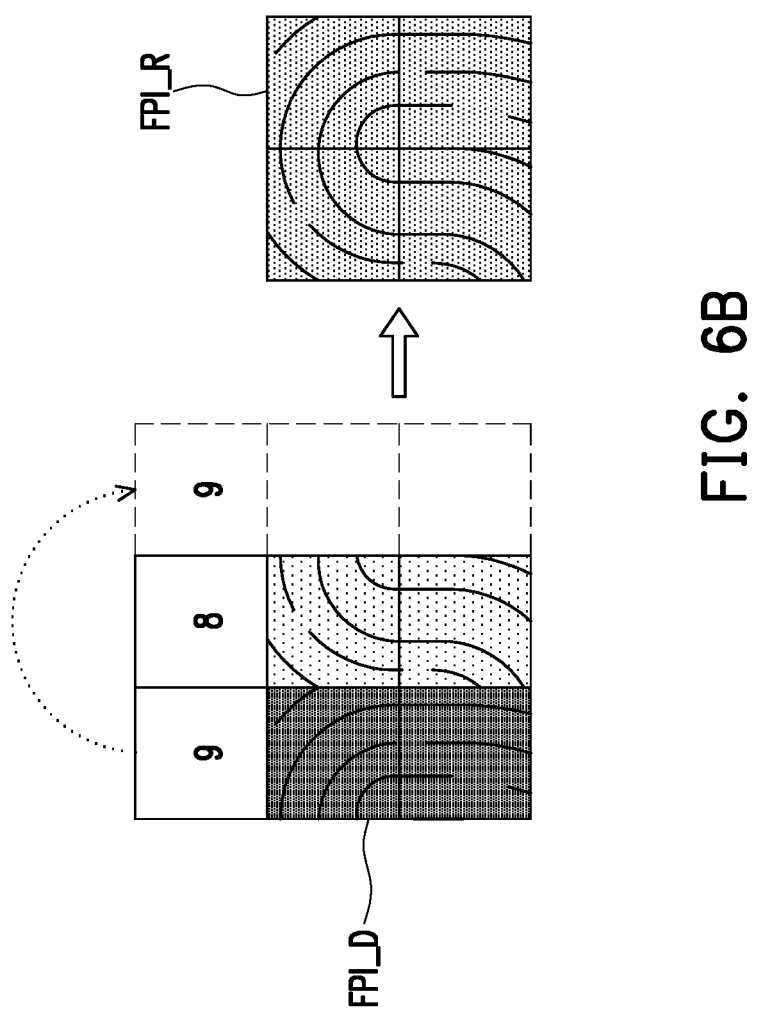
FIG. 6B is a schematic diagram illustrating rearrangement of the fingerprint sensing data to generate the fingerprint image according to an embodiment of the invention.

FIG. 6A illustrates some fingerprint sensing zones of the display panel are determined to sense the fingerprint image according to an embodiment of the invention. FIG. 6B is a schematic diagram illustrating rearrangement of the fingerprint sensing data to generate the fingerprint image according to an embodiment of the invention. Referring to FIG. 6A and FIG. 6B, the display panel 120 includes a plurality of large fingerprint sensing zones Z1 to Z8 and a small fingerprint sensing zone Z9. Only one row of fingerprint sensing zones Z1 to Z9 is illustrated in FIG. 6A for conciseness, but the invention is not limited thereto. The display panel 120 may include a plurality of rows of the fingerprint sensing zones Z1 to Z9. Each of the fingerprint sensing zones Z1 to Z8 includes 4 fingerprint sensors 126 arranged in a 2×2 array. The fingerprint sensing zone Z9 includes 2 fingerprint sensors 126 arranged in a 2×1 array. The size of the fingerprint sensing zones Z1 to Z8 (larger zones) is larger than the size of the fingerprint sensing zone Z9 (small zone).

Figure 8:
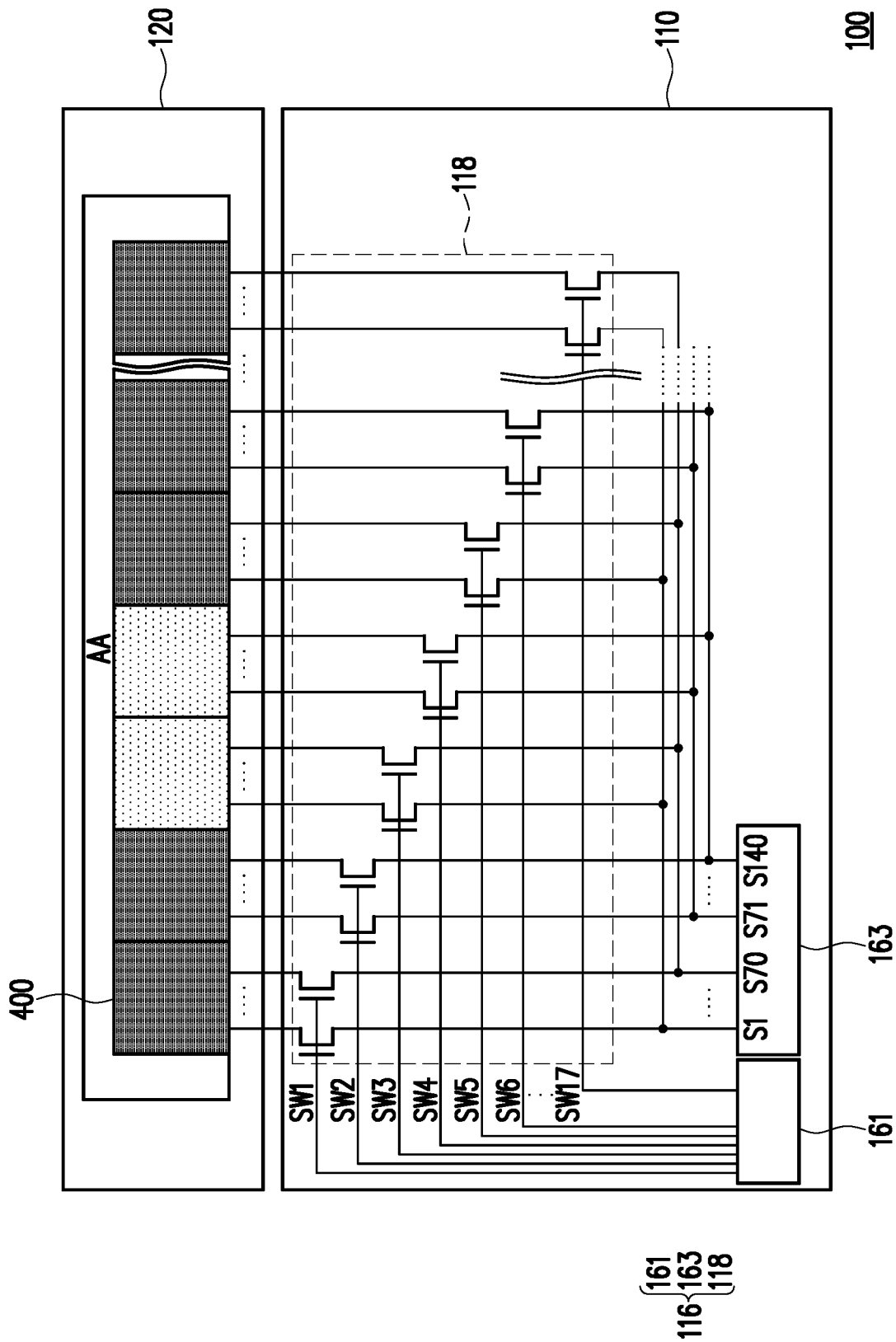
FIG. 8 is a detail diagram illustrating the electronic device depicted in FIG. 4 according to an embodiment of the invention.

In addition, the fingerprint sensing circuit 116 includes a plurality of fingerprint sensing channels S1 to S70 and fingerprint sensing channels S71 to S140 as shown in FIG. 8. The total number of the fingerprint sensing channels S1 to S140 is 140, but the invention is not limited thereto. The fingerprint sensing channels S1 to S70 and the fingerprint sensing channels S71 to S140 are physically arranged in sequence in the fingerprint sensing circuit 116. The fingerprint sensing columns of the fingerprint sensing zones Z1 to Z9 output the fingerprint sensing signal to corresponding fingerprint sensing channels S1 to S70 and fingerprint sensing channels S71 to S140. For example, the fingerprint sensing column 7 of the fingerprint sensing zone Z4 outputs the fingerprint sensing signal to the corresponding fingerprint sensing channels S1 to S70, and the fingerprint sensing column 8 of the fingerprint sensing zone Z4 outputs the fingerprint sensing signal to the corresponding fingerprint sensing channels S71 to S140. Similarly, the fingerprint sensing column 9 of the fingerprint sensing zone Z5 outputs the fingerprint sensing signal to the corresponding fingerprint sensing channels S1 to S70, and the fingerprint sensing column 10 of the fingerprint sensing zone Z5 outputs the fingerprint sensing signal to the corresponding fingerprint sensing channels S71 to S140. The number of the fingerprint sensing channels that each fingerprint sensing column corresponds is 70, but the invention is not limited thereto. The corresponding relationship of the fingerprint sensing columns of other fingerprint sensing zones and the fingerprint sensing channels is illustrated in FIG. 6A and FIG. 8.

In the present embodiment, the fingerprint sensing circuit 116 determines at least one of the fingerprint sensing zones Z1 to Z9 to perform the fingerprint sensing operation according to a reference point R of a touch area TSA, and the fingerprint sensing circuit 116 receives the fingerprint sensing signal from the at least one of the fingerprint sensing zones Z1 to Z9. The fingerprint sensing circuit 116 determines whether to rearrange the fingerprint sensing signal according to the number of the fingerprint sensing zones Z1 to Z9 determined to perform the fingerprint sensing operation. For example, when even fingerprint sensing zones of the fingerprint sensing zones Z1 to Z9 are determined to perform the fingerprint sensing operation, the fingerprint sensing circuit 116 rearranges the fingerprint sensing data, and when odd fingerprint sensing zones of the fingerprint sensing zones Z1 to Z9 are determined to perform the fingerprint sensing operation, the fingerprint sensing circuit 116 does not rearrange the fingerprint sensing data.

To be specific, in FIG. 6A, the fingerprint sensing circuit 116 determines even fingerprint sensing zones Z4 and Z5 to perform the fingerprint sensing operation according to the reference point R of the touch area TSA since the reference point R locates in the fingerprint sensing zones Z4 and Z5, e.g. the edge of the fingerprint sensing zones Z4 and Z5. In the present embodiment, the reference point R of the touch area TSA may be a geometric center or a geometric gravity center of the touch area TSA. The fingerprint sensing zone Z4 includes fingerprint sensing columns 7 and 8. The fingerprint sensing zone Z5 includes fingerprint sensing columns 9 and 10.

The fingerprint sensing circuit 116 receives the fingerprint sensing signal from the fingerprint sensing column 8 of the fingerprint sensing zone Z4 and the fingerprint sensing column 9 of the fingerprint sensing zone Z5. The fingerprint sensing circuit 116 receives the fingerprint sensing signal from the fingerprint sensing columns 8 and 9 at a time.

The fingerprint sensing column 8 corresponds to 70 fingerprint sensing channels S71 to S140 and outputs fingerprint sensing signal to the 70 fingerprint sensing channels S71 to S140. The fingerprint sensing column 9 corresponds to 70 fingerprint sensing channels S1 to S70 and outputs fingerprint sensing signal to the 70 fingerprint sensing channels S1 to S70. The channel numbers that the fingerprint sensing columns 8 and 9 correspond are the same. The summation of the channel numbers that the fingerprint sensing columns 8 and 9 correspond is equal to the total number of the fingerprint sensing channels S1 to S140.

In FIG. 6B, the fingerprint sensing data FPI_D received by the fingerprint sensing circuit 116 is illustrated. The fingerprint sensing circuit 116 rearranges the fingerprint sensing data FPI_D to generate the fingerprint image FPI_R. The fingerprint sensing circuit 116 outputs the fingerprint image FPI_R to a next-stage circuit for fingerprint identification, e.g. an application processor or a fingerprint identification or recognition circuit of an electronic device. The rearranged fingerprint image FPI_R is a portion of the fingerprint image FPI and includes sufficient fingerprint features for fingerprint identification.

In an embodiment, the fingerprint sensing circuit 116 may further receive fingerprint sensing signal from the fingerprint sensing columns 7 and 10. The fingerprint sensing columns 7 and 10 correspond to the fingerprint sensing channels S1 to S70 and the fingerprint sensing channels S71 to S140. The fingerprint sensing circuit 116 receives the fingerprint sensing signal from the fingerprint sensing columns 7 and 10 at a time. The fingerprint sensing circuit 116 receives the fingerprint sensing signal from the fingerprint sensing columns 8 and 9 and the fingerprint sensing signal from the fingerprint sensing columns 7 and 10 in a time-division manner. For example, the fingerprint sensing circuit 116 may receive the fingerprint sensing signal from the fingerprint sensing columns 8 and 9 in a first phase of a fingerprint sensing period and receive the fingerprint sensing signal from the fingerprint sensing columns 7 and 10 in a second phase of the same fingerprint sensing period. The fingerprint sensing circuit 116 rearranges the fingerprint sensing data from the fingerprint sensing columns 7 to 10 to generate a larger fingerprint image for fingerprint identification.

In the present embodiment, the fingerprint sensing circuit 116 determines at least one of the fingerprint sensing zones Z1 to Z9 to perform the fingerprint sensing operation according to the reference point R of the touch area TSA. The information related to the reference point R of the touch area TSA may be inputted to the fingerprint sensing circuit 116 from the touch sensing circuit 114. The touch sensing circuit 114 is configured to receive touch sensing signals from the display panel 120 and determine the touch area TSA according to the touch sensing signals.

Therefore, when even fingerprint sensing zones Z4 and Z5, e.g. two fingerprint sensing zones, of the fingerprint sensing zones Z1 to Z9 are determined to perform the fingerprint sensing operation, the fingerprint sensing circuit 116 rearranges the fingerprint sensing data FPI_D. The even fingerprint sensing zones Z4 and Z5 includes the first fingerprint sensing zone Z4 and the second fingerprint sensing zone Z5, each of the first fingerprint sensing zone Z4 and the second fingerprint sensing zone Z5 includes a plurality of fingerprint sensing columns. The fingerprint sensing circuit 116 receives the fingerprint sensing signal S1 from a part of the fingerprint sensing columns of the first fingerprint sensing zone Z4 and a part of the fingerprint sensing columns of the second fingerprint sensing zone Z5.

The fingerprint sensing circuit 116 includes a plurality of fingerprint sensing channels S1 to S140. The part of the fingerprint sensing columns of the first fingerprint sensing zone Z4 corresponds to a first number of the fingerprint sensing channels S71 to S140, i.e. 70. The part of the fingerprint sensing columns of the second fingerprint sensing zone Z5 corresponds to a second number of the fingerprint sensing channels S1 to S70, i.e. 70. The first number and the second number are the same. The summation of the first number and the second number is equal to the total number of the fingerprint sensing channels S1 to S140.

Figure 7:
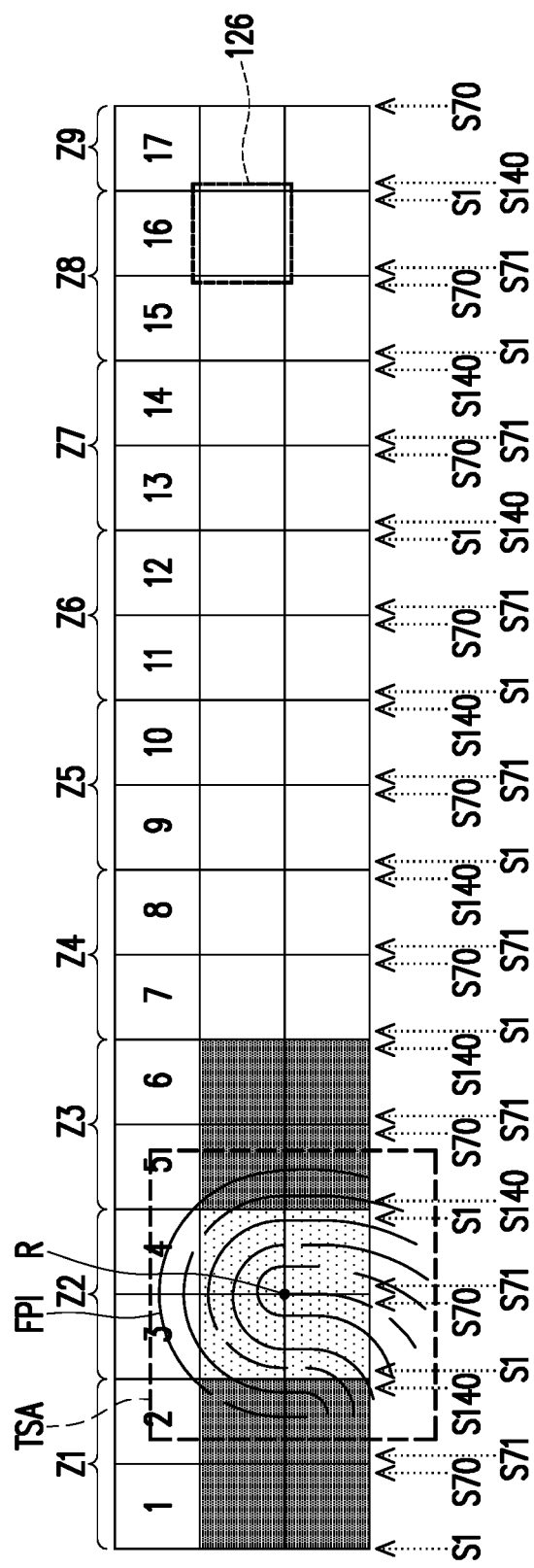
FIG. 7 illustrates some fingerprint sensing zones of the display panel are determined to sense the fingerprint image according to another embodiment of the invention.

FIG. 7 illustrates some fingerprint sensing zones of the display panel are determined to sense the fingerprint image according to an embodiment of the invention. Referring to FIG. 7, the rearrangement of the fingerprint sensing data is optional in the present embodiment.

To be specific, the fingerprint sensing circuit 116 determines odd fingerprint sensing zones Z1 to Z3 to perform the fingerprint sensing operation according to the reference point R of the touch area TSA since the reference point R locates in the fingerprint sensing zone Z2. The fingerprint sensing zone Z2 is located between the fingerprint sensing zones Z1 and Z3. In an embodiment, the fingerprint sensing circuit 116 may simply determine the single fingerprint sensing zone Z2 to perform the fingerprint sensing operation.

The fingerprint sensing zone Z2 includes the fingerprint sensing columns 3 and 4. The fingerprint sensing columns 3 and 4 of the fingerprint sensing zone Z2 respectively correspond to the fingerprint sensing channels S1 to S70 and the fingerprint sensing channels S71 to S140. The channel number that the fingerprint sensing columns 3 and 4 correspond is equal to the total number of the fingerprint sensing channels S1 to S140. The fingerprint sensing circuit 116 receives the fingerprint sensing signal from all of the fingerprint sensing columns 3 and 4 of the fingerprint sensing zone Z2 during a first phase of a fingerprint sensing period. The fingerprint sensing circuit 116 does not rearrange the fingerprint sensing data of the fingerprint sensing columns 3 and 4 since the fingerprint sensing data of the fingerprint sensing columns 3 and 4 corresponds to a portion of the fingerprint image FPI, and the portion of the fingerprint image FPI includes sufficient fingerprint features for fingerprint identification.

In addition, the fingerprint sensing circuit 116 may further receive fingerprint sensing data signal the fingerprint sensing column 2 of the fingerprint sensing zone Z1 and the fingerprint sensing zone Z3. The fingerprint sensing columns 2 and 5 correspond to the fingerprint sensing channels S71 to S140 and the fingerprint sensing channels S1 to S70. The fingerprint sensing circuit 116 receives the fingerprint sensing signal from the fingerprint sensing columns 2 and 5 during a second phase of the same fingerprint sensing period. The fingerprint sensing circuit 116 receives the fingerprint sensing signal from the fingerprint sensing columns 3 and 4 and the fingerprint sensing signal from the fingerprint sensing columns 2 and 5 in a time-division manner. The fingerprint sensing circuit 116 may rearrange the fingerprint sensing data of the fingerprint sensing columns 7 to 10 to generate a larger fingerprint image for fingerprint identification. The rearrangement of the fingerprint sensing data is optional in the present embodiment.

Therefore, when odd fingerprint sensing zones Z1 to Z3, e.g. three fingerprint sensing zones, of the fingerprint sensing zones Z1 to Z9 are determined to perform the fingerprint sensing operation, the fingerprint sensing circuit 116 does not rearrange the fingerprint sensing data. The odd fingerprint sensing zones Z1 to Z3 include the first fingerprint sensing zone Z1, the second fingerprint sensing zone Z3 and the third fingerprint sensing zone Z2. The third fingerprint sensing zone Z2 is located between the first fingerprint sensing zone Z1 and the second fingerprint sensing zone Z3. The first fingerprint sensing zone Z1 includes a plurality of fingerprint sensing columns 1 and 2. The second fingerprint sensing zone Z3 includes a plurality of fingerprint sensing columns 5 and 6. The third fingerprint sensing zone Z2 includes a plurality of fingerprint sensing columns 3 and 4.

The fingerprint sensing circuit 116 receives the fingerprint sensing signal from all of the fingerprint sensing columns 3 and 4 of the third fingerprint sensing zone Z2. The all of the fingerprint sensing columns 3 and 4 of the third fingerprint sensing zone Z2 corresponds to a third number of the fingerprint sensing channels S1 to S140, i.e. 140. The third number is equal to a total number of the fingerprint sensing channels S1 to S140.

The fingerprint sensing circuit 116 receives the fingerprint sensing signal from a part of the fingerprint sensing columns of the first fingerprint sensing zone Z1 and a part of the fingerprint sensing columns of the second fingerprint sensing zone Z3. The part of the fingerprint sensing columns of the first fingerprint sensing zone Z1 corresponds to a first number of the fingerprint sensing channels S71 to S140, i.e. 70. The part of the fingerprint sensing columns of the second fingerprint sensing zone Z3 corresponds to a second number of the fingerprint sensing channels S1 to S70, i.e. 70. The first number and the second number are the same. The summation of the first number and the second number is equal to the total number of the fingerprint sensing channels S1 to S140.

FIG. 8 is a detail diagram illustrating the electronic device depicted in FIG. 4 according to an embodiment of the invention. Referring to FIG. 8, the electronic device 100 includes an electronic circuit 110 and a display panel 120. The electronic circuit 110 is configurable to be coupled to the display panel 120. The electronic circuit 110 includes a fingerprint sensing circuit 116. The fingerprint sensing circuit 116 includes a digital circuit 161, a converter circuit 163 and a switch circuit 118. The display panel 120 includes a plurality of fingerprint sensing zones 400 disposed in an active area AA of the display panel 120. Only one row of fingerprint sensing zones 400 is illustrated in FIG. 8 for conciseness, but the invention is not limited thereto. The display panel 120 may include a plurality of rows of the fingerprint sensing zones 400.

The converter circuit 163 is configured to receive the fingerprint sensing signals corresponding to the fingerprint sensing data. The converter circuit 163 converts the fingerprint sensing signal of an analog format into the fingerprint sensing signal of a digital format to obtain fingerprint sensing data and transmits the fingerprint sensing data to the digital circuit 161. The converter circuit 163 includes a plurality of fingerprint sensing channels S1 to S140 coupled to the switch circuit 118. The fingerprint sensing channels S1 to S140 receive the corresponding fingerprint sensing signal from the selected fingerprint sensing zone. Preferably, the fingerprint sensing signal carried on the selected fingerprint sensing zone is read out and received by the fingerprint sensing channels S1 to S140 at a time. Each of the fingerprint sensing channels S1 to S140 may include an AFE circuit and/or an ADC circuit. In the present embodiment, the converter circuit 163 may include 140 fingerprint sensing channels. Enough teaching, suggestion, and implementation illustration for the operation and hardware structures of the converter circuit 163 can be obtained with reference to common knowledge in the related art, which is not repeated hereinafter.

The switch circuit 118 is controlled by control signals SW1 to SW17 and configured to receive the fingerprint sensing signal from the at least one of the fingerprint sensing zones determined to perform the fingerprint sensing operation and output the received the fingerprint sensing signal to the converter circuit 163. The digital circuit 161 outputs the control signals SW1 to SW17 the switch circuit 118. The switch circuit 118 is controlled to select at least one fingerprint sensing zone for the fingerprint sensing operation via control signals SW1 to SW17. The switch circuit 118 is coupled to the fingerprint sensors 126 via the fingerprint sensing lines FSL as shown in FIG. 2. The switch circuit 118 is configured to receive the fingerprint sensing signal from the fingerprint sensors 126 via the selected fingerprint sensing lines FSL. The switch circuit 118 may include a plurality of switches, and each of the switches corresponds to a fingerprint sensing line FSL as depicted in FIG. 2. The digital circuit 161 controls the switch circuit 118 to turn on a part of the plurality of switches corresponding to the fingerprint sensing lines to establish coupling between the fingerprint sensing lines and the fingerprint sensing channels for the fingerprint sensing operation. On the other hand, the digital circuit 161 controls the switch circuit 118 to turn off the rest of the plurality of switches corresponding to the rest of the fingerprint sensing lines that is not selected.

Figure 9:
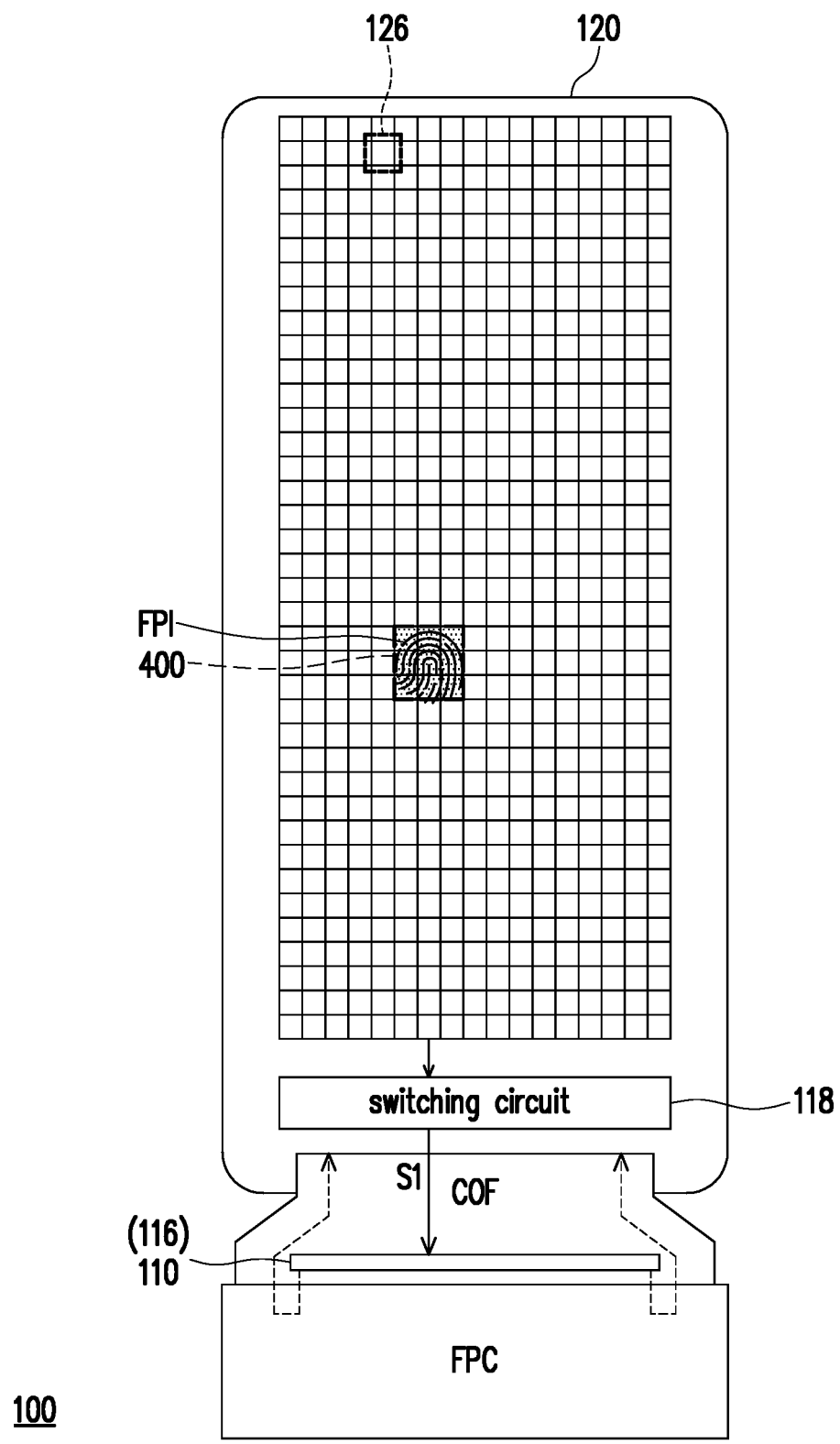
FIG. 9 is a schematic diagram illustrating an electronic device according to another embodiment of the invention.
Figure 10:
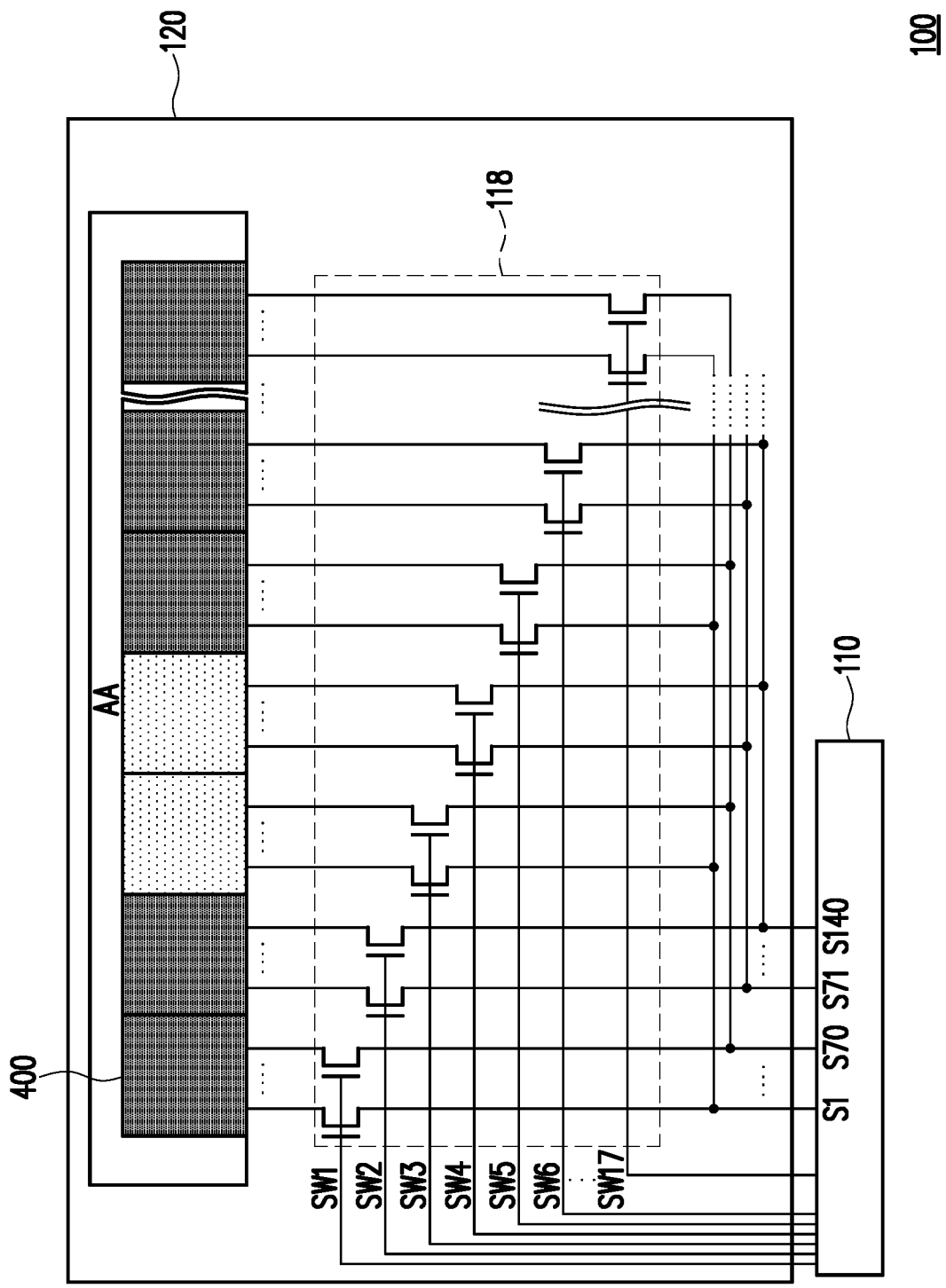
FIG. 10 is a detail diagram illustrating the electronic device depicted in FIG. 9 according to an embodiment of the invention.

In the embodiments of FIG. 4 and FIG. 8, the switch circuit 118 is disposed in the electronic circuit 110, but the invention is not limited thereto. FIG. 9 is a schematic diagram illustrating an electronic device according to another embodiment of the invention. FIG. 10 is a detail diagram illustrating the electronic device depicted in FIG. 9 according to an embodiment of the invention. Referring to FIG. 9 and FIG. 10, the switch circuit 118 is disposed in the display panel 120 in the present embodiment. The display panel 120 includes the switch circuit 118 configured to receive the fingerprint sensing signal S1 from the at least one of the fingerprint sensing zones 400 determined to perform the fingerprint sensing operation and output the received the fingerprint sensing signal S1 to the electronic circuit 110.

Figure 11A:
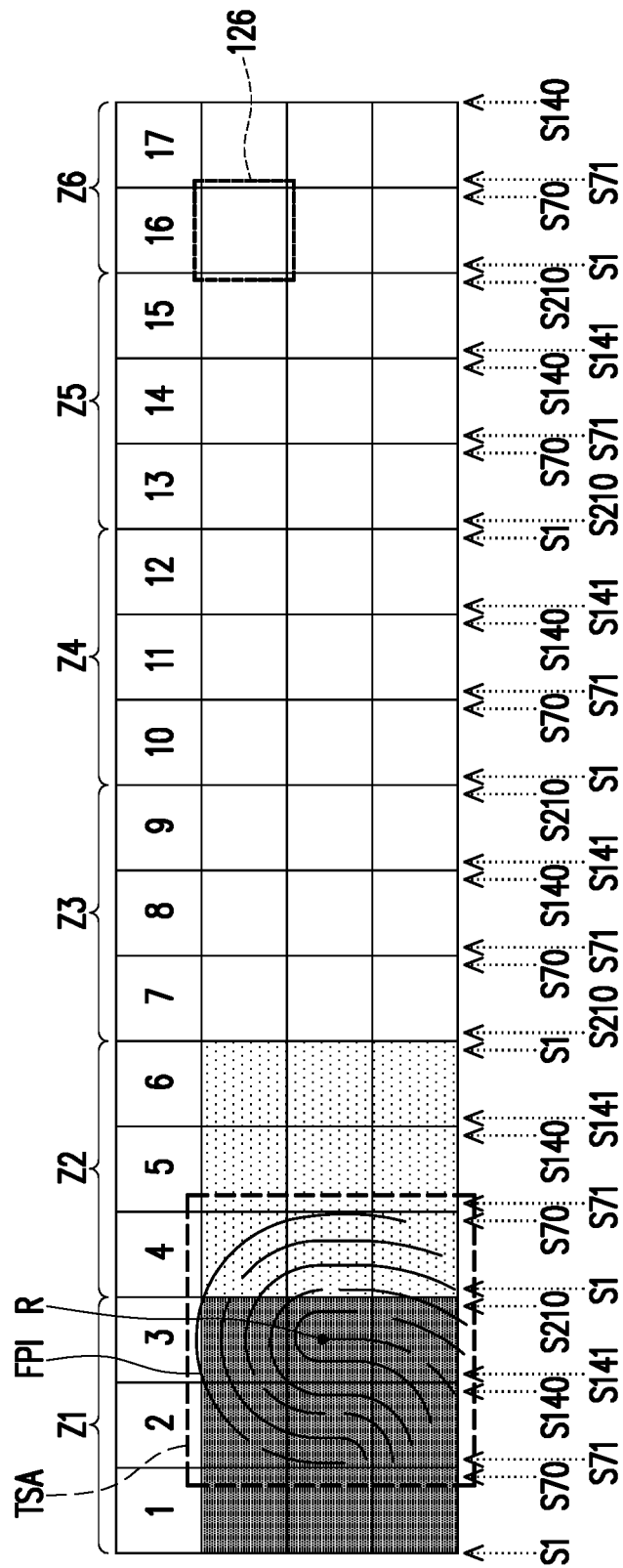
FIG. 11A illustrates some fingerprint sensing zones of the display panel are determined to sense the fingerprint image according to another embodiment of the invention.
Figure 11B:
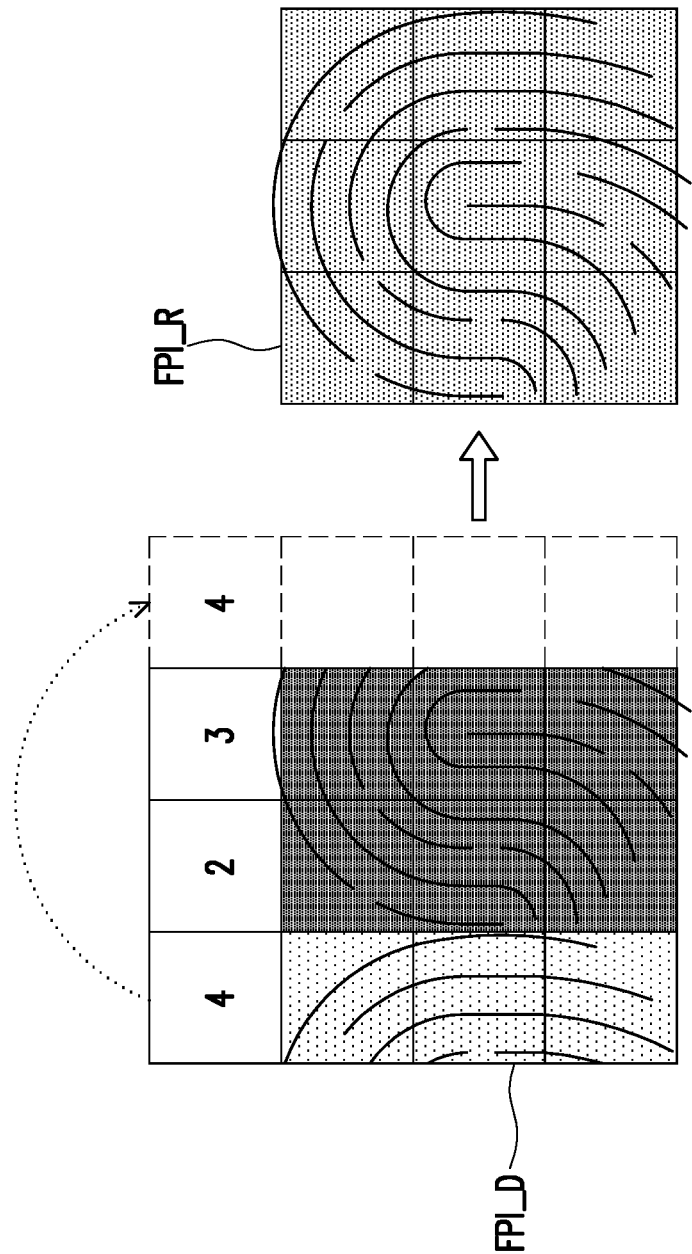
FIG. 11B is a schematic diagram illustrating rearrangement of the fingerprint sensing data to generate the fingerprint image according to another embodiment of the invention.

FIG. 11A illustrates some fingerprint sensing zones of the display panel are determined to sense the fingerprint image according to an embodiment of the invention. FIG. 11B is a schematic diagram illustrating rearrangement of the fingerprint sensing data to generate the fingerprint image according to an embodiment of the invention. Referring to FIG. 11A and FIG. 11B, the display panel 120 includes a plurality of large fingerprint sensing zones Z1 to Z5 and a small fingerprint sensing zone Z6. Only one row of fingerprint sensing zones Z1 to Z6 is illustrated in FIG. 11A for conciseness, but the invention is not limited thereto. The display panel 120 may include a plurality of rows of the fingerprint sensing zones Z1 to Z6. Each of the fingerprint sensing zones Z1 to Z5 includes 9 fingerprint sensors 126 arranged in a 3×3 array. The fingerprint sensing zone Z6 includes 6 fingerprint sensors 126 arranged in a 3×2 array. The size of the fingerprint sensing zones Z1 to Z5 (larger zones) is larger than the size of the fingerprint sensing zone Z6 (small zone).

In addition, the fingerprint sensing circuit 116 includes a plurality of fingerprint sensing channels S1 to S70, fingerprint sensing channel S71 to S140, and fingerprint sensing channel S141 to S210. The total number of the fingerprint sensing channels S1 to S210 is 210, but the invention is not limited thereto. The fingerprint sensing channels S1 to S70, the fingerprint sensing channels S71 to S140, and the fingerprint sensing channels S141 to S210 are physically arranged in sequence in the fingerprint sensing circuit 116. The fingerprint sensing columns of the fingerprint sensing zones Z1 to Z5 output the fingerprint sensing signal to corresponding fingerprint sensing channels S1 to S70, fingerprint sensing channels S71 to S140, and fingerprint sensing channels S141 to S210. For example, the fingerprint sensing columns 2 and 3 of the fingerprint sensing zone Z1 respectively outputs the fingerprint sensing signal to the corresponding fingerprint sensing channels S71 to S140 and fingerprint sensing channels S141 to S210, and the fingerprint sensing column 4 of the fingerprint sensing zone Z2 outputs the fingerprint sensing signal to the corresponding fingerprint sensing channels S1 to S70. The number of the fingerprint sensing channels that each fingerprint sensing column corresponds is 70, but the invention is not limited thereto. The corresponding relationship of the fingerprint sensing columns of other fingerprint sensing zones and the fingerprint sensing channels is illustrated in FIG. 11A.

In the present embodiment, the fingerprint sensing circuit 116 determines at least one of the fingerprint sensing zones Z1 to Z6 to perform the fingerprint sensing operation according to a reference point R of a touch area TSA, and the fingerprint sensing circuit 116 receives the fingerprint sensing signal from the at least one of the fingerprint sensing zones Z1 to Z6. The fingerprint sensing circuit 116 determines whether to rearrange the fingerprint sensing signal according to the number of the fingerprint sensing zones Z1 to Z6 determined to perform the fingerprint sensing operation. For example, when even fingerprint sensing zones of the fingerprint sensing zones Z1 to Z6 are determined to perform the fingerprint sensing operation, the fingerprint sensing circuit 116 rearranges the fingerprint sensing data, and when odd fingerprint sensing zones of the fingerprint sensing zones Z1 to Z6 are determined to perform the fingerprint sensing operation, the fingerprint sensing circuit 116 does not rearrange the fingerprint sensing data.

To be specific, in FIG. 11A, the fingerprint sensing circuit 116 determines even fingerprint sensing zones Z1 and Z2 to perform the fingerprint sensing operation according to the reference point R of the touch area TSA since the reference point R locates in the fingerprint sensing zone Z1. The fingerprint sensing zone Z1 includes fingerprint sensing columns 1 to 3. The fingerprint sensing zone Z2 includes fingerprint sensing columns 4 to 6.

The fingerprint sensing circuit 116 receives the fingerprint sensing signal from the fingerprint sensing columns 2 and 3 of the fingerprint sensing zone Z1 and the fingerprint sensing column 4 of the fingerprint sensing zone Z2. The fingerprint sensing circuit 116 receives the fingerprint sensing signal from the fingerprint sensing columns 2 to 4 at a time.

The fingerprint sensing column 2 corresponds to 70 fingerprint sensing channels S71 to S140 and outputs fingerprint sensing signal to the 70 fingerprint sensing channels S71 to S140. The fingerprint sensing column 3 corresponds to 70 fingerprint sensing channels S141 to S210 and outputs fingerprint sensing signal to the 70 fingerprint sensing channels S141 to S210. The fingerprint sensing columns 2 and 3 are a part of the fingerprint sensing columns of the first fingerprint sensing zone Z1 selected to perform the fingerprint sensing operation. The fingerprint sensing column 4 corresponds to 70 fingerprint sensing channels S1 to S70 and outputs fingerprint sensing signal to the 70 fingerprint sensing channels S1 to S70. The fingerprint sensing column 4 is a part of the fingerprint sensing columns of the second fingerprint sensing zone Z2 selected to perform the fingerprint sensing operation.

The channel number that the fingerprint sensing columns 2 and 3 correspond is 140 (a first number). The channel number that the fingerprint sensing column 4 corresponds is 70 (a second number). The first number and the second number are different, and the first number is larger than the second number. The summation of the first number and the second number is equal to the total number of the fingerprint sensing channels S1 to S210.

In FIG. 11B, the fingerprint sensing data FPI_D received by the fingerprint sensing circuit 116 is illustrated. The fingerprint sensing circuit 116 rearranges the fingerprint sensing data FPI_D to generate the fingerprint image FPI_R. The rearranged fingerprint image FPI_R can be deemed as the whole fingerprint image FPI and includes sufficient fingerprint features for fingerprint identification.

Figure 12A:
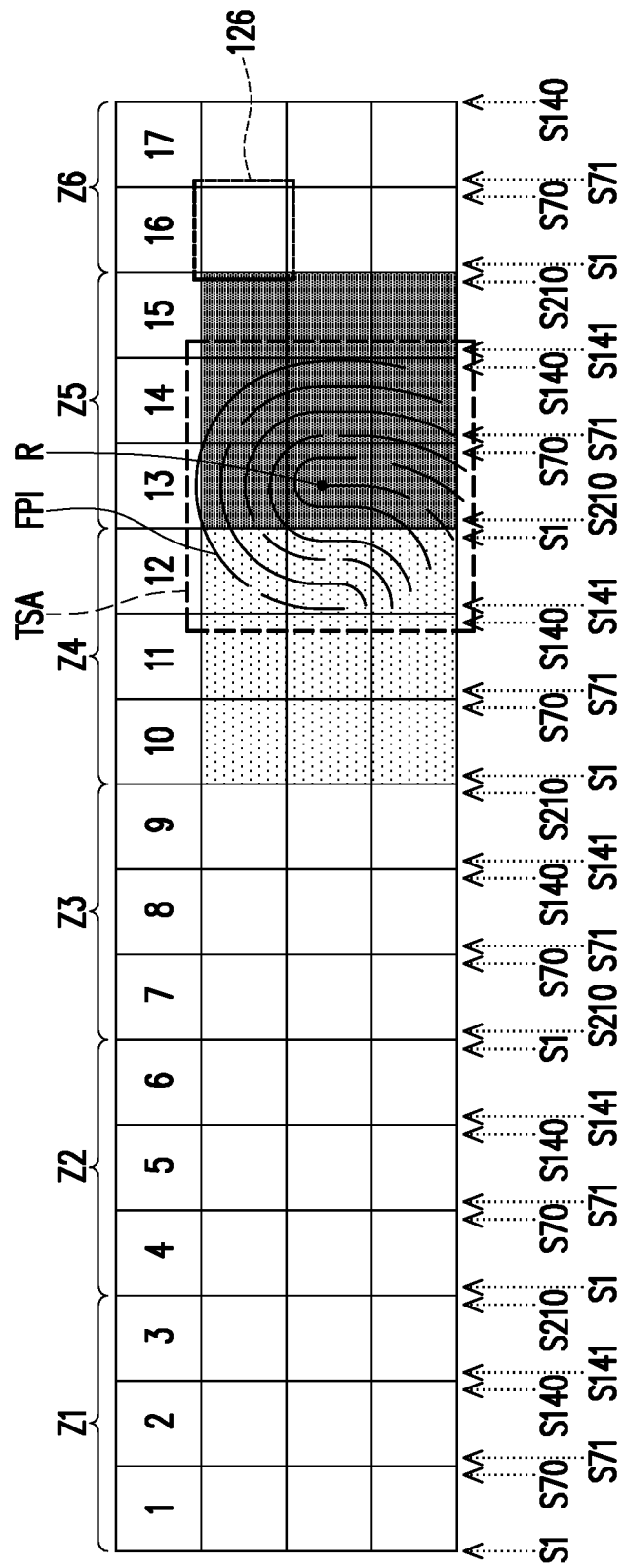
FIG. 12A illustrates some fingerprint sensing zones of the display panel are determined to sense the fingerprint image according to another embodiment of the invention.
Figure 12B:
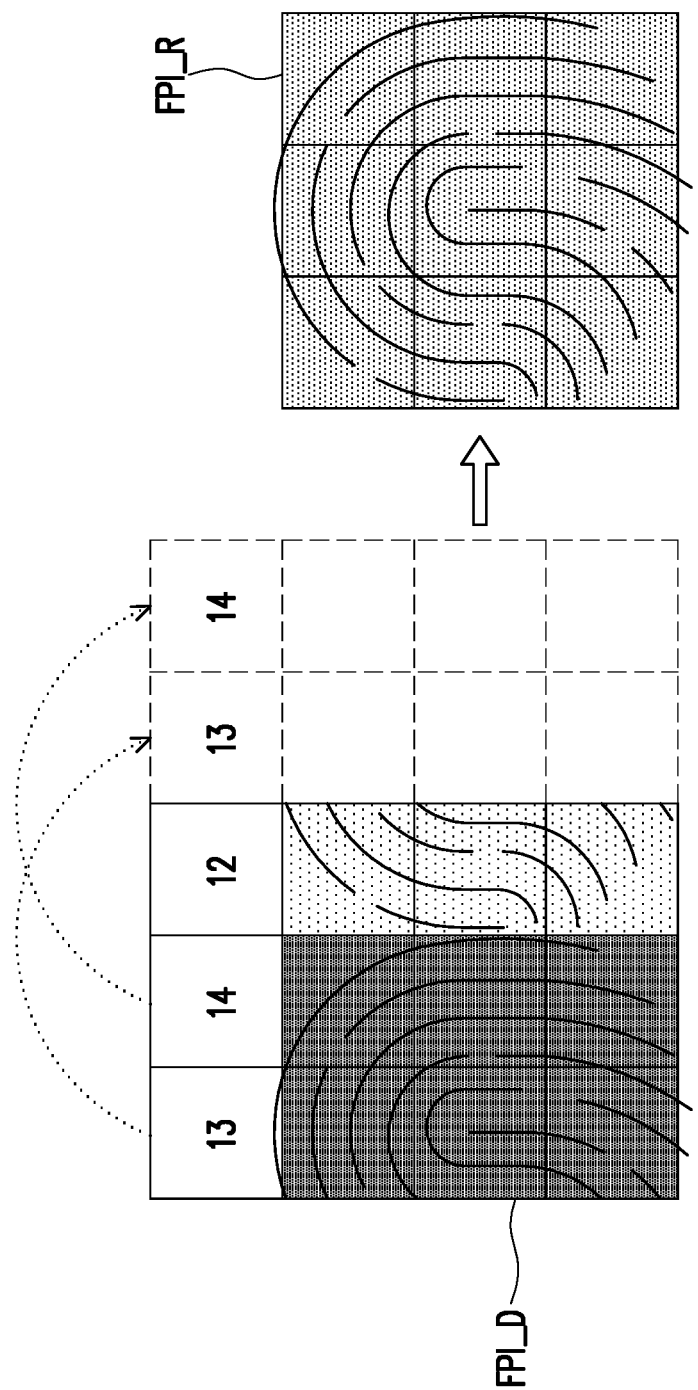
FIG. 12B is a schematic diagram illustrating rearrangement of the fingerprint sensing data to generate the fingerprint image according to another embodiment of the invention.

FIG. 12A illustrates some fingerprint sensing zones of the display panel are determined to sense the fingerprint image according to an embodiment of the invention. FIG. 12B is a schematic diagram illustrating rearrangement of the fingerprint sensing data to generate the fingerprint image according to an embodiment of the invention. Referring to FIG. 12A and FIG. 12B, the fingerprint sensing circuit 116 determines even fingerprint sensing zones Z4 and Z5 to perform the fingerprint sensing operation according to the reference point R of the touch area TSA since the reference point R locates in the fingerprint sensing zone Z5. The fingerprint sensing zone Z4 includes fingerprint sensing columns 10 to 12. The fingerprint sensing zone Z5 includes fingerprint sensing columns 13 to 15.

The fingerprint sensing circuit 116 receives the fingerprint sensing signal from the fingerprint sensing columns 13 and 14 of the fingerprint sensing zone Z5 and the fingerprint sensing column 12 of the fingerprint sensing zone Z4. The fingerprint sensing circuit 116 receives the fingerprint sensing signal from the fingerprint sensing columns 12 to 14 at a time.

The fingerprint sensing column 12 corresponds to 70 fingerprint sensing channels S141 to S210 and outputs fingerprint sensing signal to the 70 fingerprint sensing channels S141 to S210. The fingerprint sensing column 12 is a part of the fingerprint sensing columns of the first fingerprint sensing zone Z4 selected to perform the fingerprint sensing operation. The fingerprint sensing column 13 corresponds to 70 fingerprint sensing channels S1 to S70 and outputs fingerprint sensing signal to the 70 fingerprint sensing channels S1 to S70. The fingerprint sensing column 14 corresponds to 70 fingerprint sensing channels S71 to S140 and outputs fingerprint sensing signal to the 70 fingerprint sensing channels S71 to S140. The fingerprint sensing columns 13 and 14 are a part of the fingerprint sensing columns of the second fingerprint sensing zone Z5 selected to perform the fingerprint sensing operation.

The channel number that the fingerprint sensing column 12 corresponds is 70 (a first number). The channel number that the fingerprint sensing columns 13 and 14 correspond is 140 (a second number). The first number and the second number are different, and the first number is smaller than the second number. The summation of the first number and the second number is equal to the total number of the fingerprint sensing channels S1 to S210.

In FIG. 12B, the fingerprint sensing data FPI_D received by the fingerprint sensing circuit 116 is illustrated. The fingerprint sensing circuit 116 rearranges the fingerprint sensing data FPI_D to generate the fingerprint image FPI_R. The rearranged fingerprint image FPI_R can be deemed as the whole fingerprint image FPI and includes sufficient fingerprint features for fingerprint identification.

Figure 13:
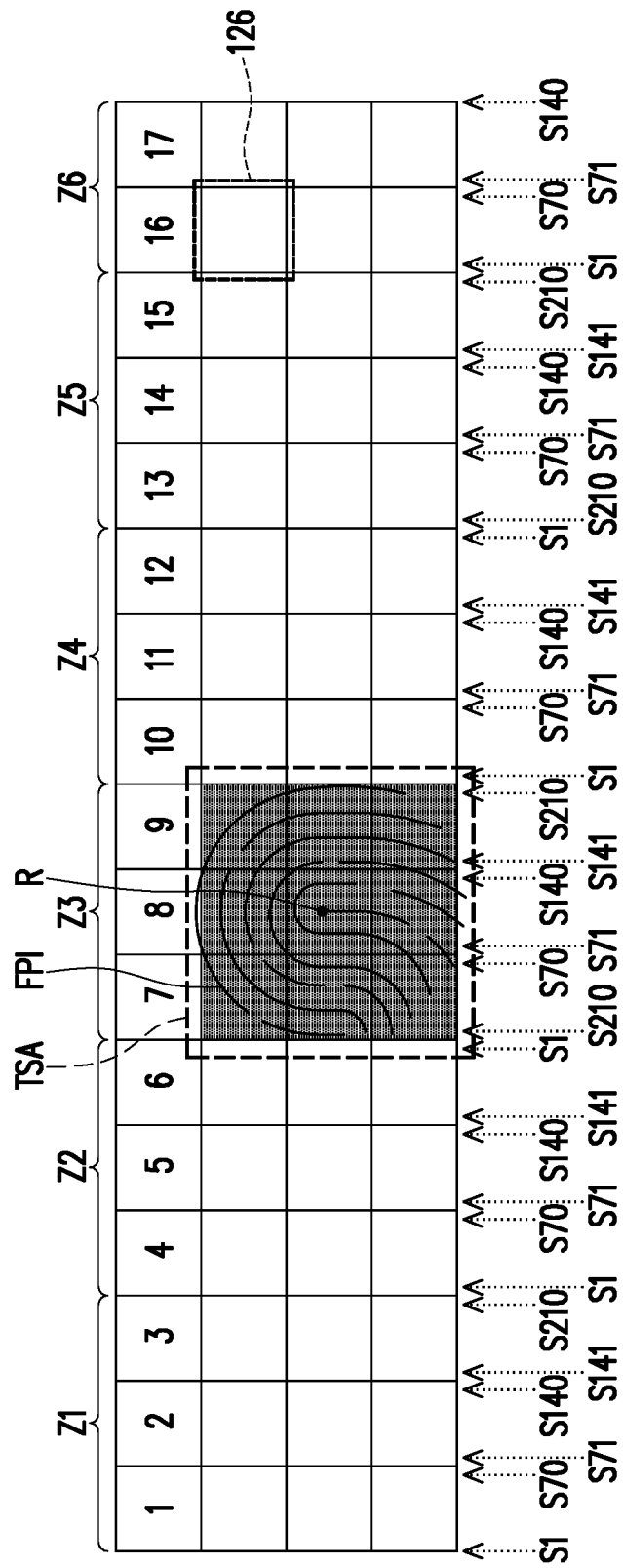
FIG. 13 illustrates some fingerprint sensing zones of the display panel are determined to sense the fingerprint image according to another embodiment of the invention.

FIG. 13 illustrates some fingerprint sensing zones of the display panel are determined to sense the fingerprint image according to an embodiment of the invention. Referring to FIG. 13, the fingerprint sensing circuit 116 does not rearrange the fingerprint sensing data in the present embodiment.

To be specific, the fingerprint sensing circuit 116 determines odd fingerprint sensing zone Z3, i.e. a single fingerprint sensing zone, to perform the fingerprint sensing operation according to the reference point R of the touch area TSA since the reference point R locates in the fingerprint sensing zone Z3. The fingerprint sensing zone Z3 includes the fingerprint sensing columns 7 to 9 corresponding to the fingerprint sensing channels S1 to S210. The channel number that the fingerprint sensing columns 7 to 9 correspond is equal to the total number of the fingerprint sensing channels S1 to S210. The fingerprint sensing circuit 116 receives the fingerprint sensing signal from all of the fingerprint sensing columns 7 to 9 of the fingerprint sensing zone Z3 at a time. The fingerprint sensing circuit 116 does not rearrange the fingerprint sensing data of the fingerprint sensing columns 7 to 9 since the fingerprint sensing data of the fingerprint sensing columns 7 to 9 can be deemed as the whole fingerprint image FPI and includes sufficient fingerprint features for fingerprint identification.

Therefore, when odd fingerprint sensing zones of the fingerprint sensing zones Z1 to Z6 are determined to perform the fingerprint sensing operation, the fingerprint sensing circuit 116 does not rearrange the fingerprint sensing data. The odd fingerprint sensing zones include the single fingerprint sensing zone Z3, and the single fingerprint sensing zone Z3 includes a plurality of fingerprint sensing columns 7 to 9. The fingerprint sensing circuit 116 receives the fingerprint sensing signal from all of the fingerprint sensing columns 7 to 9 of the single fingerprint sensing zone Z3. The all of the fingerprint sensing columns 7 to 9 of the single fingerprint sensing zone Z3 corresponds to a specified number, i.e. 210, of the fingerprint sensing channels, and the specified number is equal to the total number of the fingerprint sensing channels S1 to S210.

Figure 14A:
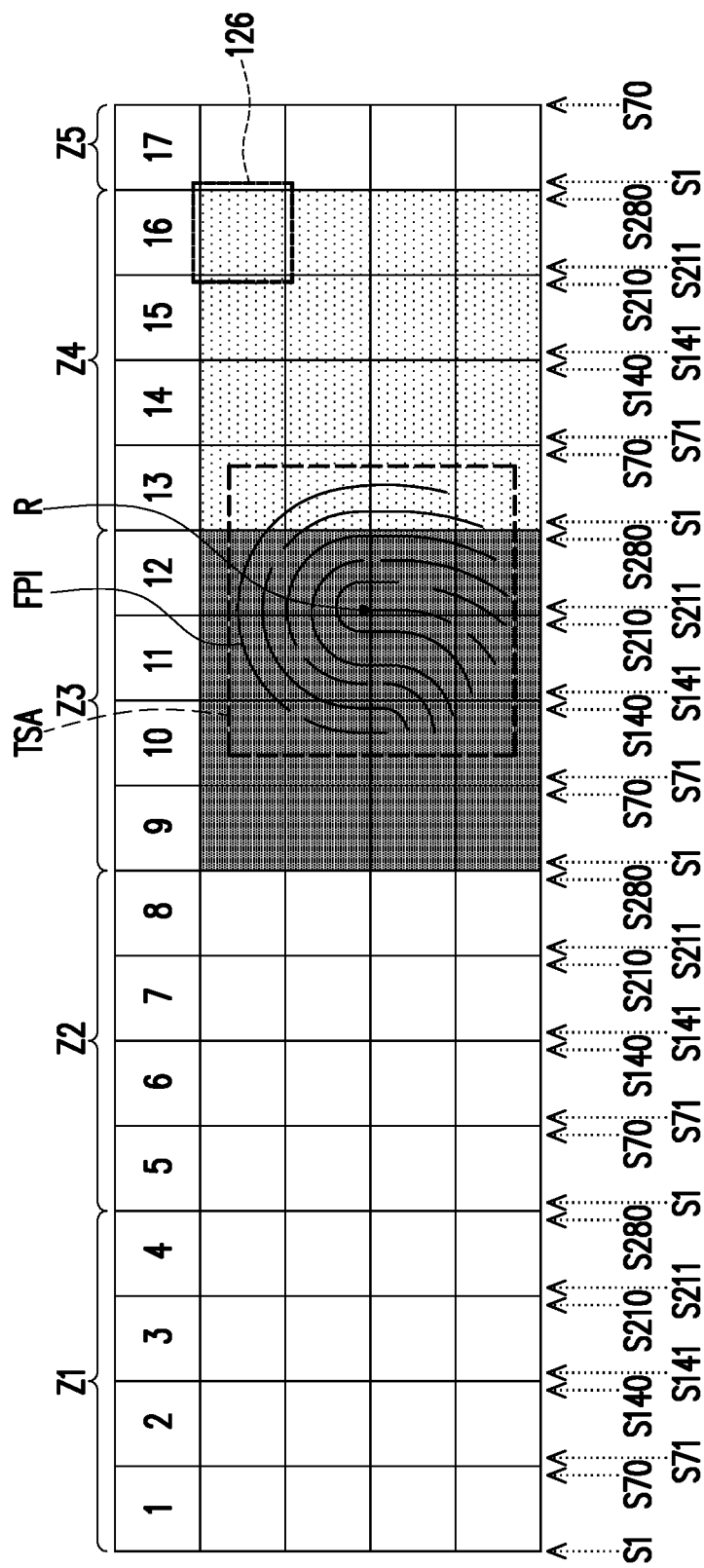
FIG. 14A illustrates some fingerprint sensing zones of the display panel are determined to sense the fingerprint image according to another embodiment of the invention.
Figure 14B:
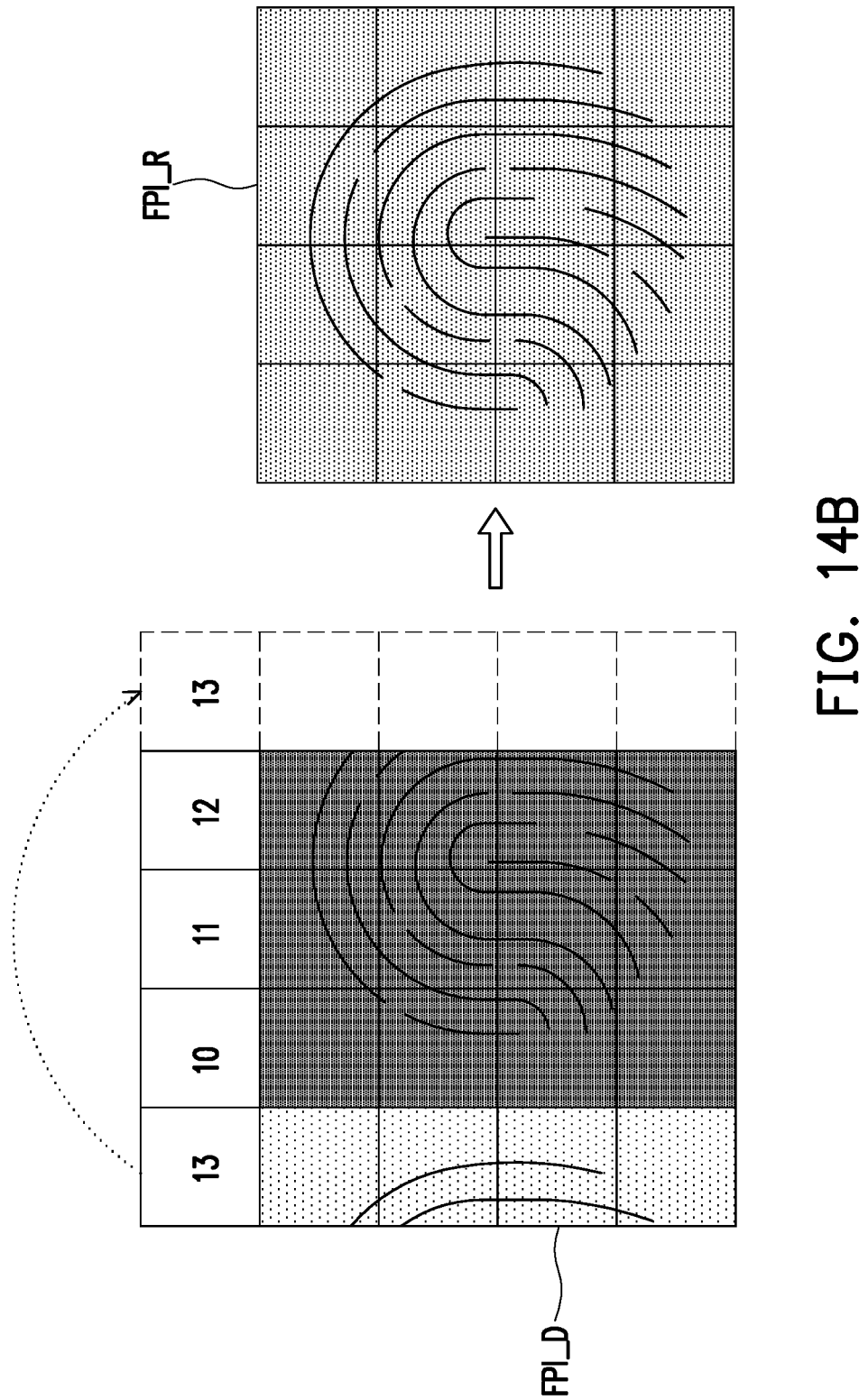
FIG. 14B is a schematic diagram illustrating rearrangement of the fingerprint sensing data to generate the fingerprint image according to another embodiment of the invention.

FIG. 14A illustrates some fingerprint sensing zones of the display panel are determined to sense the fingerprint image according to an embodiment of the invention. FIG. 14B is a schematic diagram illustrating rearrangement of the fingerprint sensing data to generate the fingerprint image according to an embodiment of the invention. Referring to FIG. 14A and FIG. 14B, the display panel 120 includes a plurality of large fingerprint sensing zones Z1 to Z4 and a small fingerprint sensing zone Z5. Only one row of fingerprint sensing zones Z1 to Z5 is illustrated in FIG. 14A for conciseness, but the invention is not limited thereto. The display panel 120 may include a plurality of rows of the fingerprint sensing zones Z1 to Z5. Each of the fingerprint sensing zones Z1 to Z4 includes 16 fingerprint sensors 126 arranged in a 4×4 array. The fingerprint sensing zone Z5 includes 4 fingerprint sensors 126 arranged in a 4×1 array. The size of the fingerprint sensing zones Z1 to Z4 (larger zones) is larger than the size of the fingerprint sensing zone Z5 (small zone).

In addition, the fingerprint sensing circuit 116 includes a plurality of fingerprint sensing channels S1 to S70, fingerprint sensing channels S71 to S140, fingerprint sensing channels S141 to S210 and fingerprint sensing channels S211 to S280. The total number of the fingerprint sensing channels S1 to S280 is 280, but the invention is not limited thereto. The fingerprint sensing channels S1 to S70, the fingerprint sensing channels S71 to S140, the fingerprint sensing channels S141 to S210 and the fingerprint sensing channels S211 to S280 are physically arranged in sequence in the fingerprint sensing circuit 116. The fingerprint sensing columns of the fingerprint sensing zones Z1 to Z4 output the fingerprint sensing signal to corresponding fingerprint sensing channels S1 to S70, fingerprint sensing channels S71 to S140, fingerprint sensing channels S141 to S210 and fingerprint sensing channels S211 to S280. For example, the fingerprint sensing columns 10 to 12 of the fingerprint sensing zone Z3 respectively outputs the fingerprint sensing signal to the corresponding fingerprint sensing channels S71 to S140, S141 to S210 and S211 to S280, and the fingerprint sensing column 13 of the fingerprint sensing zone Z4 outputs the fingerprint sensing signal to the corresponding fingerprint sensing channels S1 to S70. The number of the fingerprint sensing channels that each fingerprint sensing column corresponds is 70, but the invention is not limited thereto. The corresponding relationship of the fingerprint sensing columns of other fingerprint sensing zones and the fingerprint sensing channels is illustrated in FIG. 14A.

In the present embodiment, the fingerprint sensing circuit 116 determines at least one of the fingerprint sensing zones Z1 to Z6 to perform the fingerprint sensing operation according to a reference point R of a touch area TSA, and the fingerprint sensing circuit 116 receives the fingerprint sensing signal from the at least one of the fingerprint sensing zones Z1 to Z5. The fingerprint sensing circuit 116 determines whether to rearrange the fingerprint sensing signal according to the number of the fingerprint sensing zones Z1 to Z5 determined to perform the fingerprint sensing operation. For example, when even fingerprint sensing zones of the fingerprint sensing zones Z1 to Z5 are determined to perform the fingerprint sensing operation, the fingerprint sensing circuit 116 rearranges the fingerprint sensing data, and when odd fingerprint sensing zones of the fingerprint sensing zones Z1 to Z5 are determined to perform the fingerprint sensing operation, the fingerprint sensing circuit 116 does not rearrange the fingerprint sensing data.

To be specific, in FIG. 14A, the fingerprint sensing circuit 116 determines even fingerprint sensing zones Z3 and Z4 to perform the fingerprint sensing operation according to the reference point R of the touch area TSA since the reference point R locates in the fingerprint sensing zone Z3. The fingerprint sensing zone Z3 includes fingerprint sensing columns 9 to 12. The fingerprint sensing zone Z4 includes fingerprint sensing columns 13 to 16.

The fingerprint sensing circuit 116 receives the fingerprint sensing signal from the fingerprint sensing columns 10 to 12 of the fingerprint sensing zone Z3 and the fingerprint sensing column 13 of the fingerprint sensing zone Z4. The fingerprint sensing circuit 116 receives the fingerprint sensing signal from the fingerprint sensing columns 10 to 13 at a time.

The fingerprint sensing column 10 corresponds to 70 fingerprint sensing channels S71 to S140 and outputs fingerprint sensing signal to the 70 fingerprint sensing channels S71 to S140. The fingerprint sensing column 11 corresponds to 70 fingerprint sensing channels S141 to S210 and outputs fingerprint sensing signal to the 70 fingerprint sensing channels S141 to S210. The fingerprint sensing column 12 corresponds to 70 fingerprint sensing channels S211 to S280 and outputs fingerprint sensing signal to the 70 fingerprint sensing channels S211 to S280. The fingerprint sensing columns 10 to 12 are a part of the fingerprint sensing columns of the first fingerprint sensing zone Z3 selected to perform the fingerprint sensing operation. The fingerprint sensing column 13 corresponds to 70 fingerprint sensing channels S1 to S70 and outputs fingerprint sensing signal to the 70 fingerprint sensing channels S1 to S70. The fingerprint sensing column 13 is a part of the fingerprint sensing columns of the second fingerprint sensing zone Z4 selected to perform the fingerprint sensing operation.

The channel number that the fingerprint sensing columns 10 to 12 correspond is 210 (a first number). The channel number that the fingerprint sensing column 13 corresponds is 70 (a second number). The first number and the second number are different, and the first number is larger than the second number. The summation of the first number and the second number is equal to the total number of the fingerprint sensing channels S1 to S280.

In FIG. 14B, the fingerprint sensing data FPI_D received by the fingerprint sensing circuit 116 is illustrated. The fingerprint sensing circuit 116 rearranges the fingerprint sensing data FPI_D to generate the fingerprint image FPI_R. The rearranged fingerprint image FPI_R can be deemed as the whole fingerprint image FPI and includes sufficient fingerprint features for fingerprint identification.

Figure 15A:
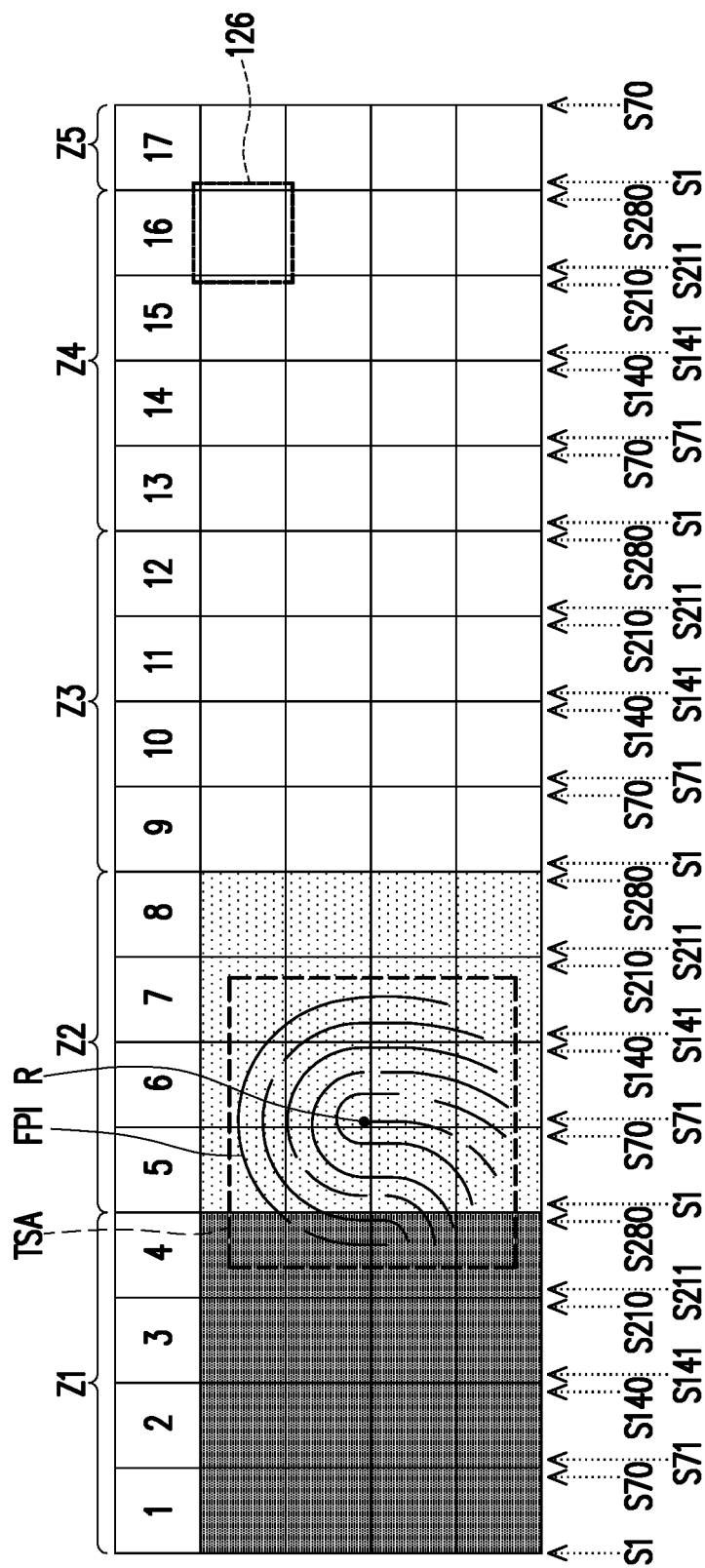
FIG. 15A illustrates some fingerprint sensing zones of the display panel are determined to sense the fingerprint image according to another embodiment of the invention.
Figure 15B:
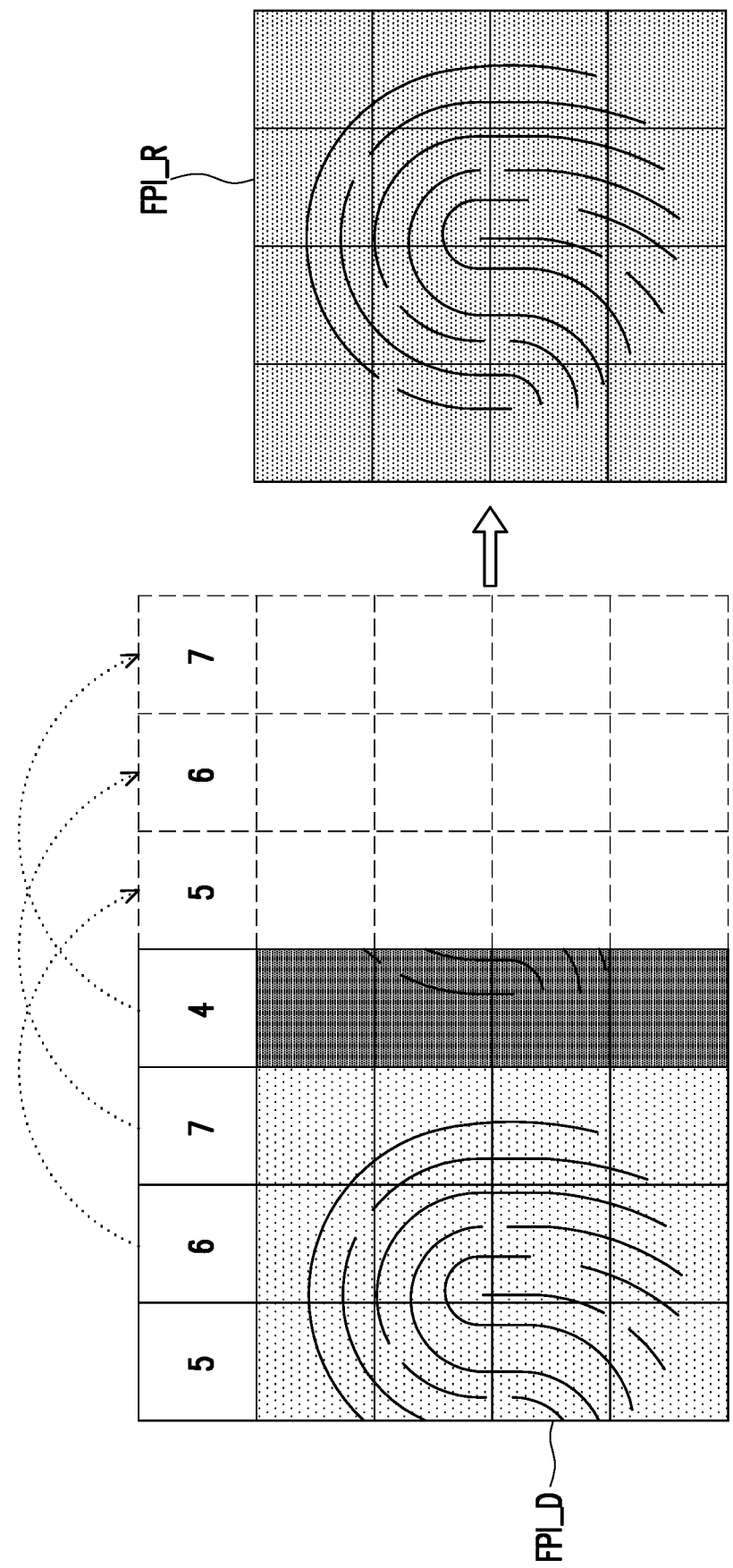
FIG. 15B is a schematic diagram illustrating rearrangement of the fingerprint sensing data to generate the fingerprint image according to another embodiment of the invention.

FIG. 15A illustrates some fingerprint sensing zones of the display panel are determined to sense the fingerprint image according to an embodiment of the invention. FIG. 15B is a schematic diagram illustrating rearrangement of the fingerprint sensing data to generate the fingerprint image according to an embodiment of the invention. Referring to FIG. 15A and FIG. 15B, the fingerprint sensing circuit 116 determines even fingerprint sensing zones Z1 and Z2 to perform the fingerprint sensing operation according to the reference point R of the touch area TSA since the reference point R locates in the fingerprint sensing zone Z2. The fingerprint sensing zone Z1 includes fingerprint sensing columns 1 to 4. The fingerprint sensing zone Z2 includes fingerprint sensing columns 5 to 8.

The fingerprint sensing circuit 116 receives the fingerprint sensing signal from the fingerprint sensing columns 5 to 7 of the fingerprint sensing zone Z2 and the fingerprint sensing column 4 of the fingerprint sensing zone Z1. The fingerprint sensing circuit 116 receives the fingerprint sensing signal from the fingerprint sensing columns 4 to 7 at a time.

The fingerprint sensing column 4 corresponds to 70 fingerprint sensing channels S211 to S280 and outputs fingerprint sensing signal to the 70 fingerprint sensing channels S211 to S280. The fingerprint sensing column 4 is a part of the fingerprint sensing columns of the first fingerprint sensing zone Z1 selected to perform the fingerprint sensing operation. The fingerprint sensing column 5 corresponds to 70 fingerprint sensing channels S1 to S70 and outputs fingerprint sensing signal to the 70 fingerprint sensing channels S1 to S70. The fingerprint sensing column 6 corresponds to 70 fingerprint sensing channels S71 to S140 and outputs fingerprint sensing signal to the 70 fingerprint sensing channels S71 to S140. The fingerprint sensing column 7 corresponds to 70 fingerprint sensing channels S141 to S210 and outputs fingerprint sensing signal to the 70 fingerprint sensing channels S141 to S210. The fingerprint sensing columns 5 to 7 are a part of the fingerprint sensing columns of the second fingerprint sensing zone Z2 selected to perform the fingerprint sensing operation.

The channel number that the fingerprint sensing column 4 corresponds is 70 (a first number). The channel number that the fingerprint sensing columns 5 to 7 correspond is 210 (a second number). The first number and the second number are different, and the first number is smaller than the second number. The summation of the first number and the second number is equal to the total number of the fingerprint sensing channels S1 to S280.

In FIG. 15B, the fingerprint sensing data FPI_D received by the fingerprint sensing circuit 116 is illustrated. The fingerprint sensing circuit 116 rearranges the fingerprint sensing data FPI_D to generate the fingerprint image FPI_R. The rearranged fingerprint image FPI_R can be deemed as the whole fingerprint image FPI and includes sufficient fingerprint features for fingerprint identification.

Figure 16A:
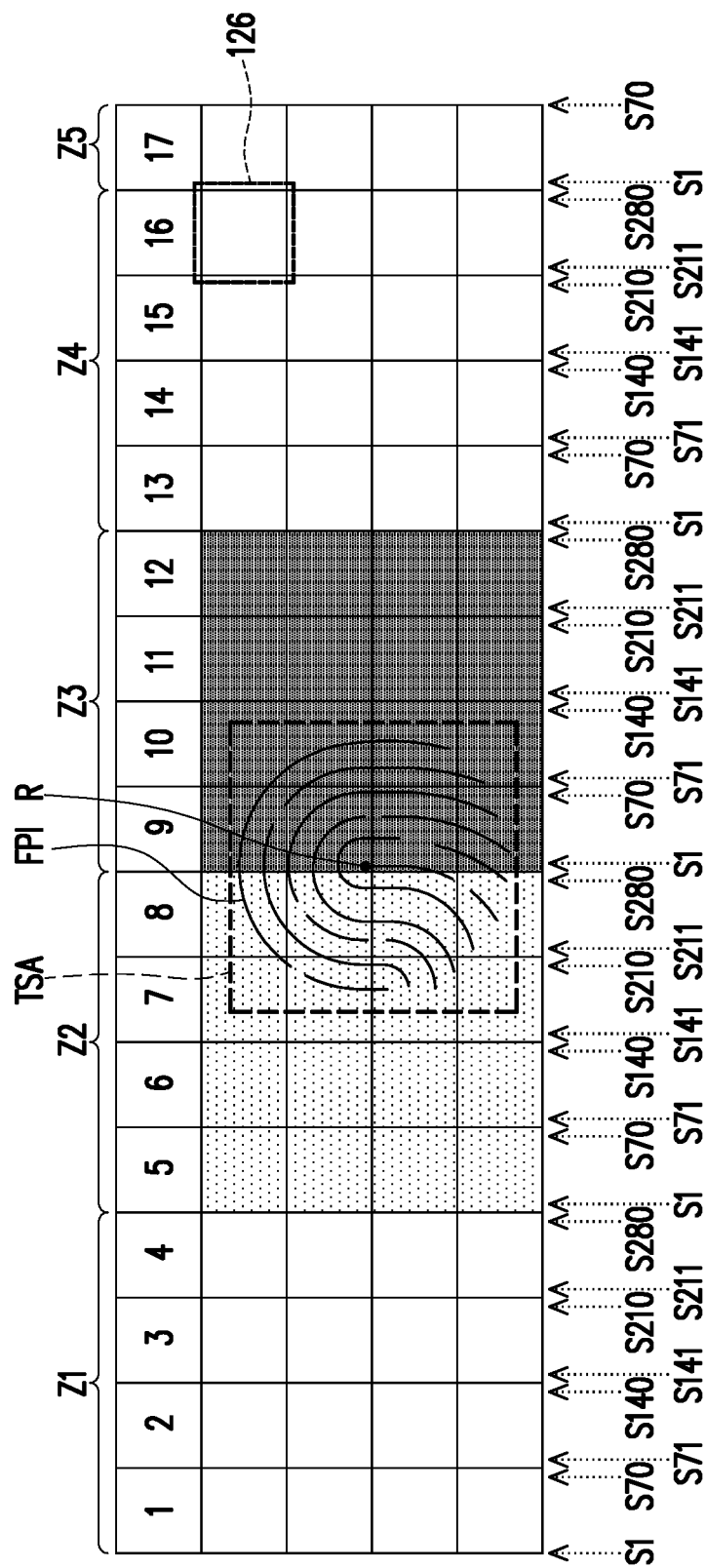
FIG. 16A illustrates some fingerprint sensing zones of the display panel are determined to sense the fingerprint image according to another embodiment of the invention.
Figure 16B:
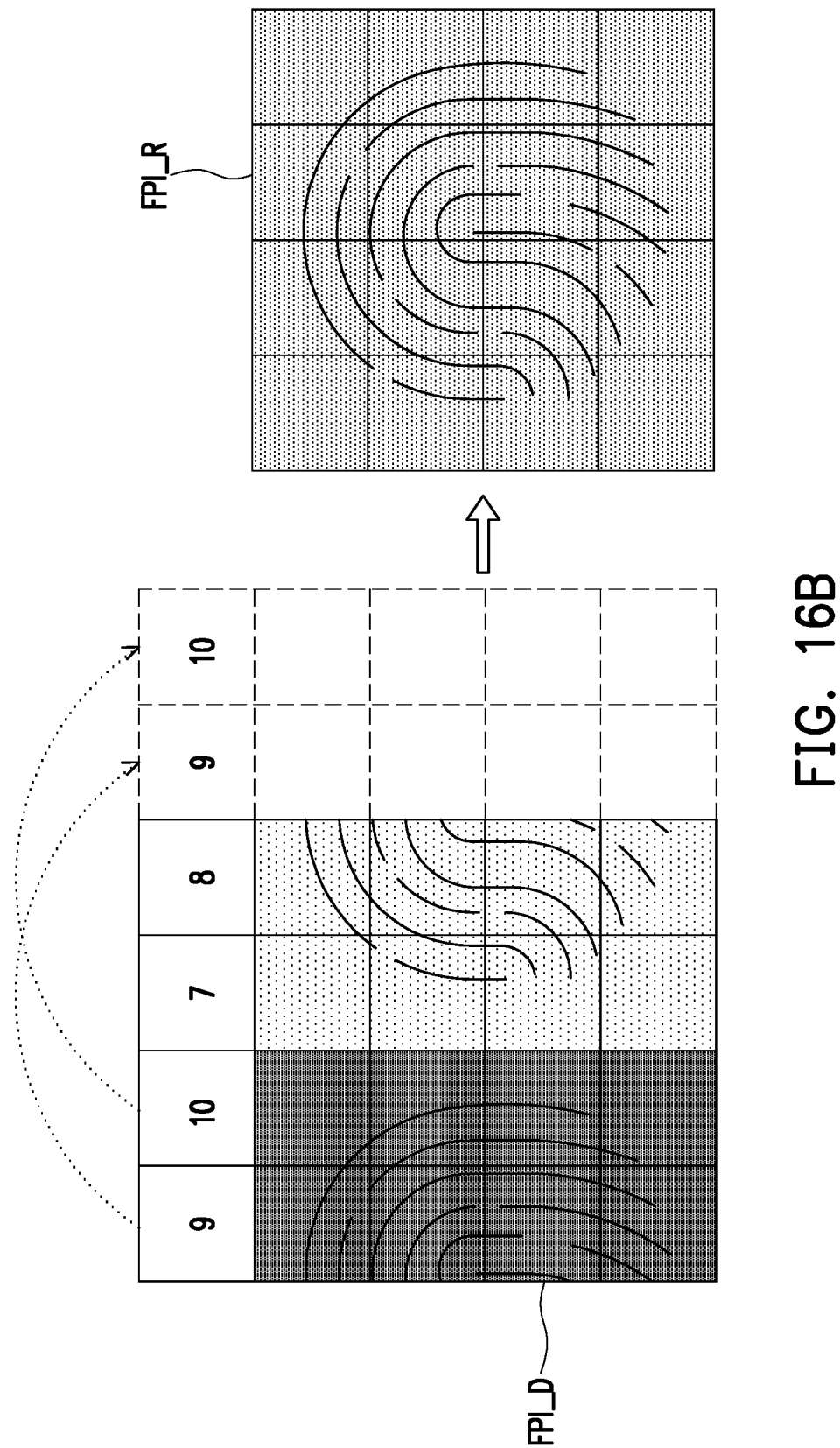
FIG. 16B is a schematic diagram illustrating rearrangement of the fingerprint sensing data to generate the fingerprint image according to another embodiment of the invention.

FIG. 16A illustrates some fingerprint sensing zones of the display panel are determined to sense the fingerprint image according to an embodiment of the invention. FIG. 16B is a schematic diagram illustrating rearrangement of the fingerprint sensing data to generate the fingerprint image according to an embodiment of the invention. Referring to FIG. 16A and FIG. 16B, the fingerprint sensing circuit 116 determines even fingerprint sensing zones Z2 and Z3 to perform the fingerprint sensing operation according to the reference point R of the touch area TSA since the reference point R locates in the fingerprint sensing zones Z2 and Z3, e.g. the edge of the fingerprint sensing zones Z2 and Z3. The fingerprint sensing zone Z2 includes fingerprint sensing columns 5 to 8. The fingerprint sensing zone Z3 includes fingerprint sensing columns 9 to 12.

The fingerprint sensing circuit 116 receives the fingerprint sensing signal from the fingerprint sensing columns 7 to 8 of the fingerprint sensing zone Z2 and the fingerprint sensing columns 9 to 10 of the fingerprint sensing zone Z3. The fingerprint sensing circuit 116 receives the fingerprint sensing signal from the fingerprint sensing columns 7 to 8 at a time.

The fingerprint sensing columns 7 and 8 respectively correspond to 70 fingerprint sensing channels S141 to S210 and 70 fingerprint sensing channels S211 to S280 and output fingerprint sensing signal to the 70 fingerprint sensing channels S141 to S210 and the 70 fingerprint sensing channels S211 to S280. The fingerprint sensing columns 7 and 8 is a part of the fingerprint sensing columns of the first fingerprint sensing zone Z2 selected to perform the fingerprint sensing operation. The fingerprint sensing columns 9 and 10 respectively correspond to 70 fingerprint sensing channels S1 to S70 and 70 fingerprint sensing channels S71 to S140 and output fingerprint sensing signal to the 70 fingerprint sensing channels S1 to S70 and the 70 fingerprint sensing channels S71 to S140. The fingerprint sensing columns 9 and 10 are a part of the fingerprint sensing columns of the second fingerprint sensing zone Z3 selected to perform the fingerprint sensing operation.

The channel number that the fingerprint sensing columns 7 and 8 corresponds is 140 (a first number). The channel number that the fingerprint sensing columns 9 and 10 corresponds is 140 (a second number). The first number and the second number are the same. The summation of the first number and the second number is equal to the total number of the fingerprint sensing channels S1 to S280.

In FIG. 16B, the fingerprint sensing data FPI_D received by the fingerprint sensing circuit 116 is illustrated. The fingerprint sensing circuit 116 rearranges the fingerprint sensing data FPI_D to generate the fingerprint image FPI_R. The rearranged fingerprint image FPI_R can be deemed as the whole fingerprint image FPI and includes sufficient fingerprint features for fingerprint identification.

Figure 17:
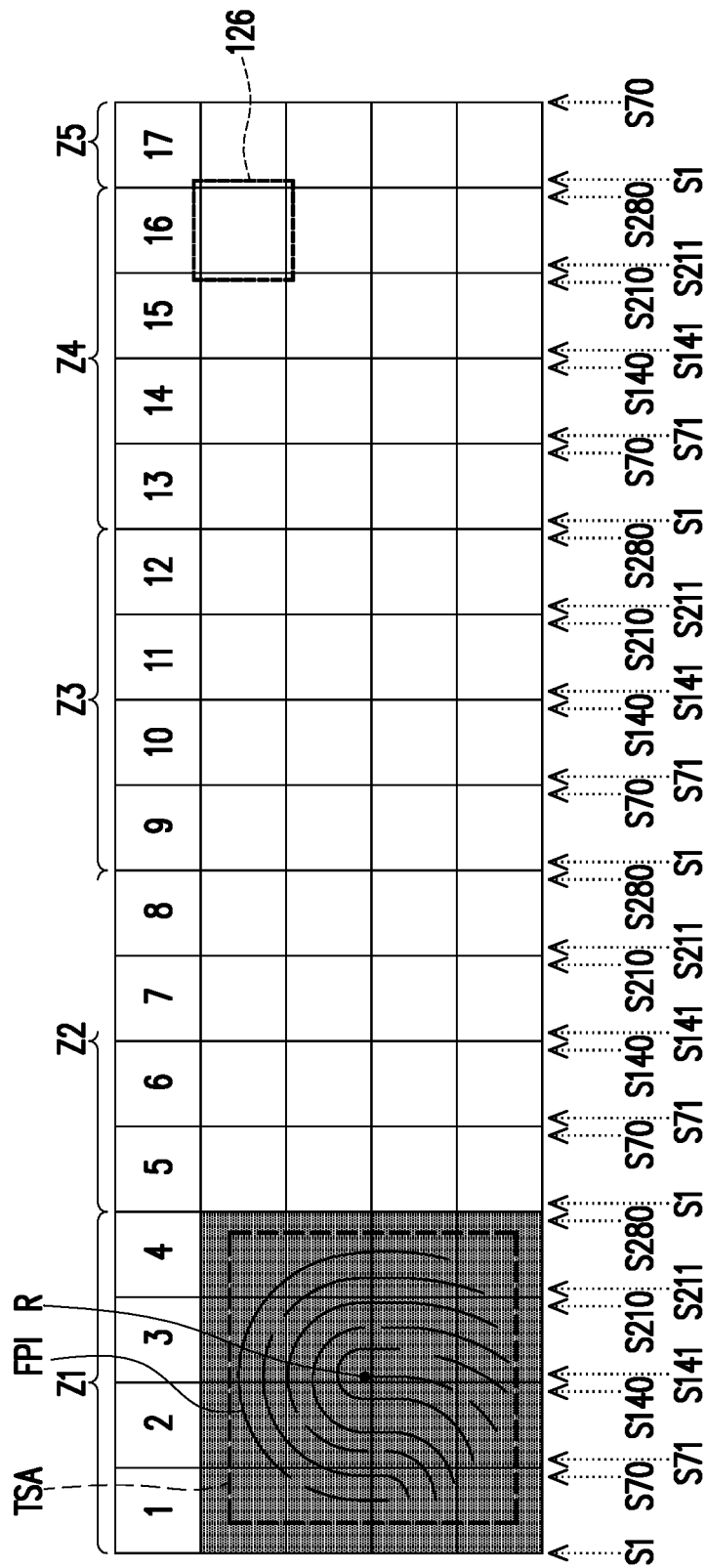
FIG. 17 illustrates some fingerprint sensing zones of the display panel are determined to sense the fingerprint image according to another embodiment of the invention.

FIG. 17 illustrates some fingerprint sensing zones of the display panel are determined to sense the fingerprint image according to an embodiment of the invention. Referring to FIG. 17, the fingerprint sensing circuit 116 does not rearrange the fingerprint sensing data in the present embodiment.

To be specific, the fingerprint sensing circuit 116 determines odd fingerprint sensing zone Z1, i.e. a single fingerprint sensing zone, to perform the fingerprint sensing operation according to the reference point R of the touch area TSA since the reference point R locates in the fingerprint sensing zone Z1. The fingerprint sensing zone Z1 includes the fingerprint sensing columns 1 to 4 corresponding to the fingerprint sensing channels S1 to S280. The channel number that the fingerprint sensing columns 1 to 4 correspond is equal to the total number of the fingerprint sensing channels S1 to S280. The fingerprint sensing circuit 116 receives the fingerprint sensing signal from all of the fingerprint sensing columns 1 to 4 of the fingerprint sensing zone Z1 at a time. The fingerprint sensing circuit 116 does not rearrange the fingerprint sensing data of the fingerprint sensing columns 1 to 4 since the fingerprint sensing data of the fingerprint sensing columns 1 to 4 can be deemed as the whole fingerprint image FPI and includes sufficient fingerprint features for fingerprint identification.

Figure 18:
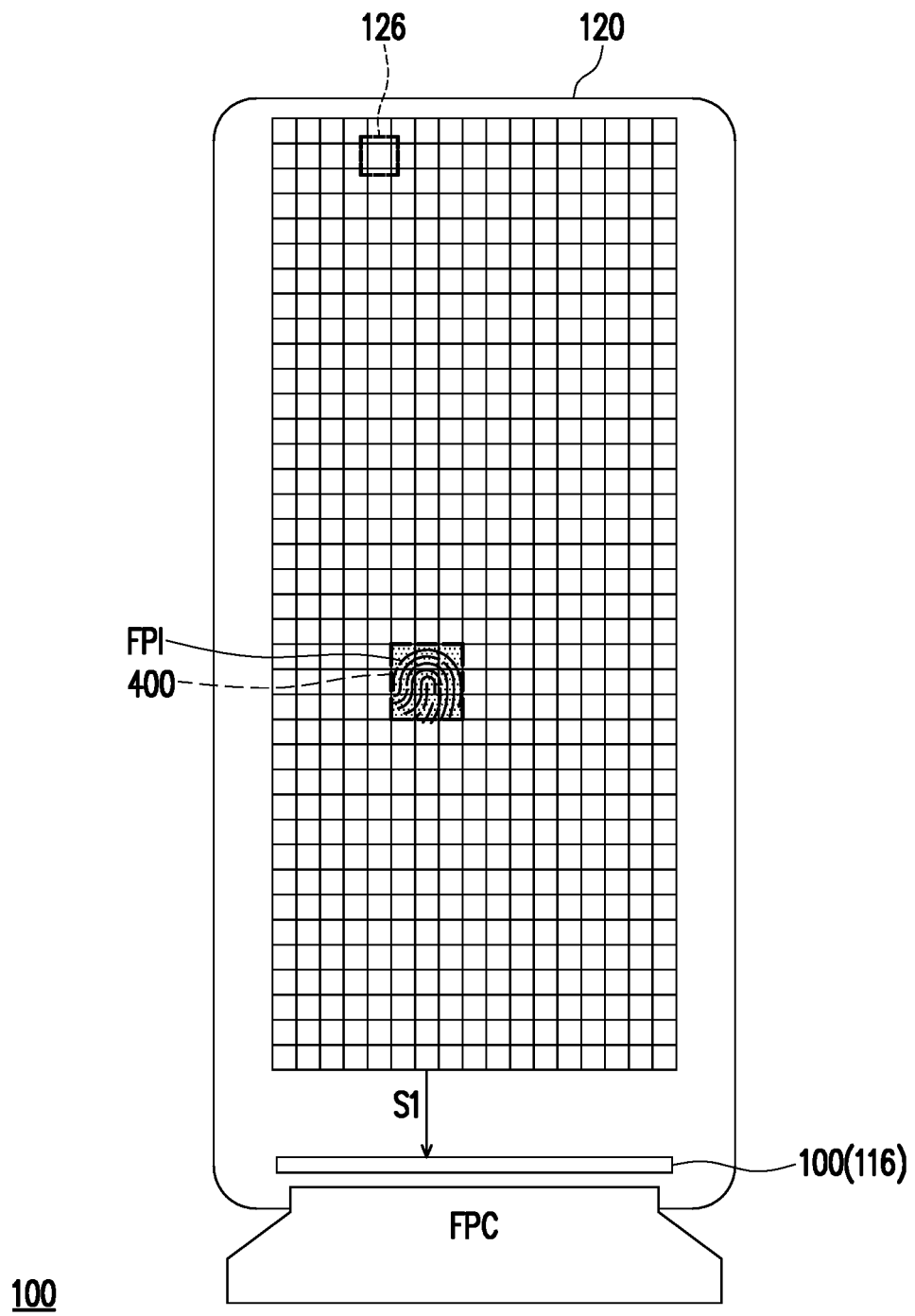
FIG. 18 and FIG. 19 are schematic diagrams respectively illustrating electronic devices according to embodiments of the invention.
Figure 19:
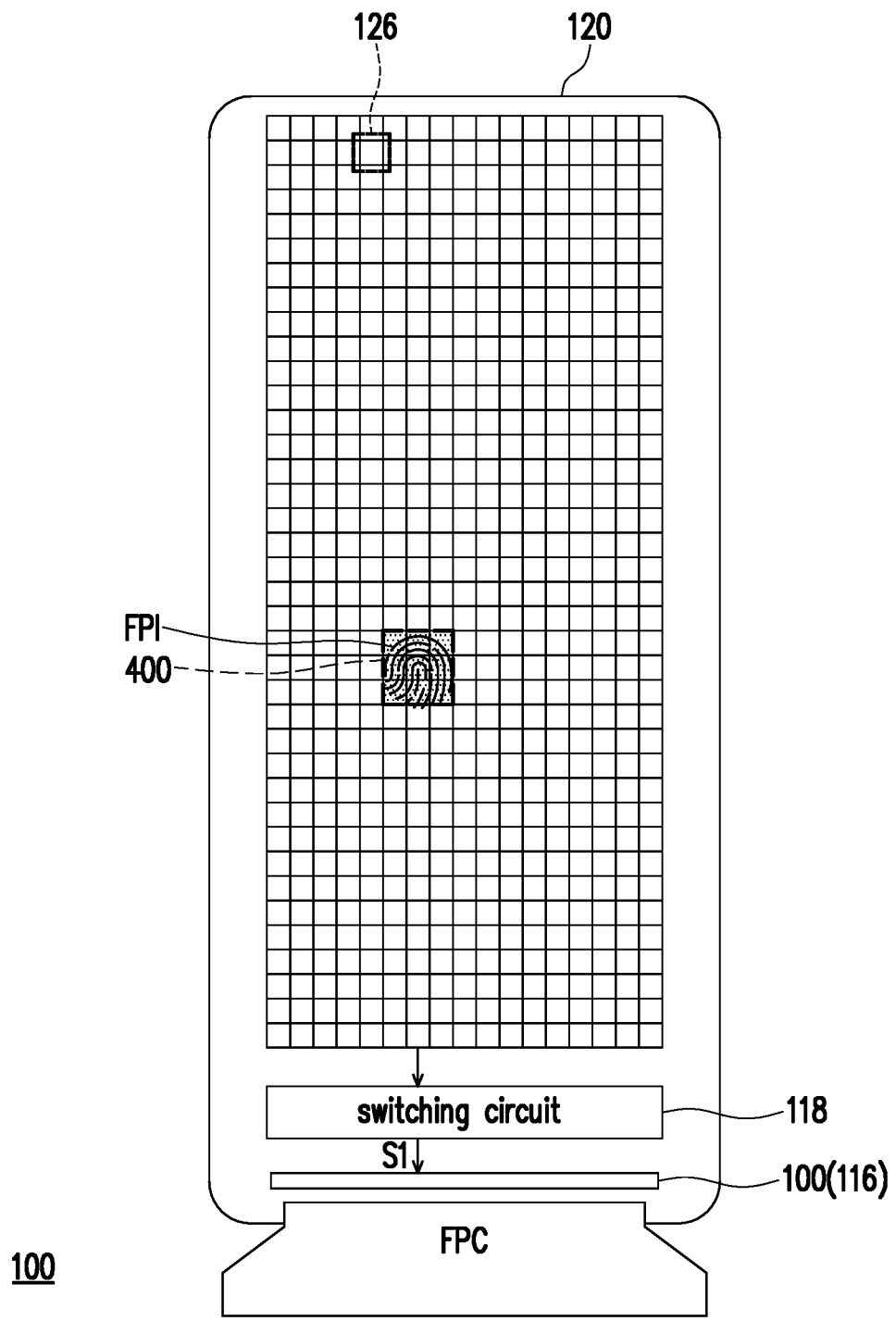

In the embodiments of FIG. 4 and FIG. 9, the electronic circuit 110 may be connected to the display panel 120 in the manner of chip on film, but the invention is not limited thereto. FIG. 18 and FIG. 19 are schematic diagrams respectively illustrating electronic devices according to embodiments of the invention. Referring to FIG. 18 and FIG. 19, the switch circuit 118 is disposed in the electronic circuit 110 in FIG. 18, and the switch circuit 118 is disposed in the display panel 120. The electronic circuit 110 is connected to the display panel 120 in a manner of chip on glass in the embodiments of FIG. 18 and FIG. 19.

Figure 20:
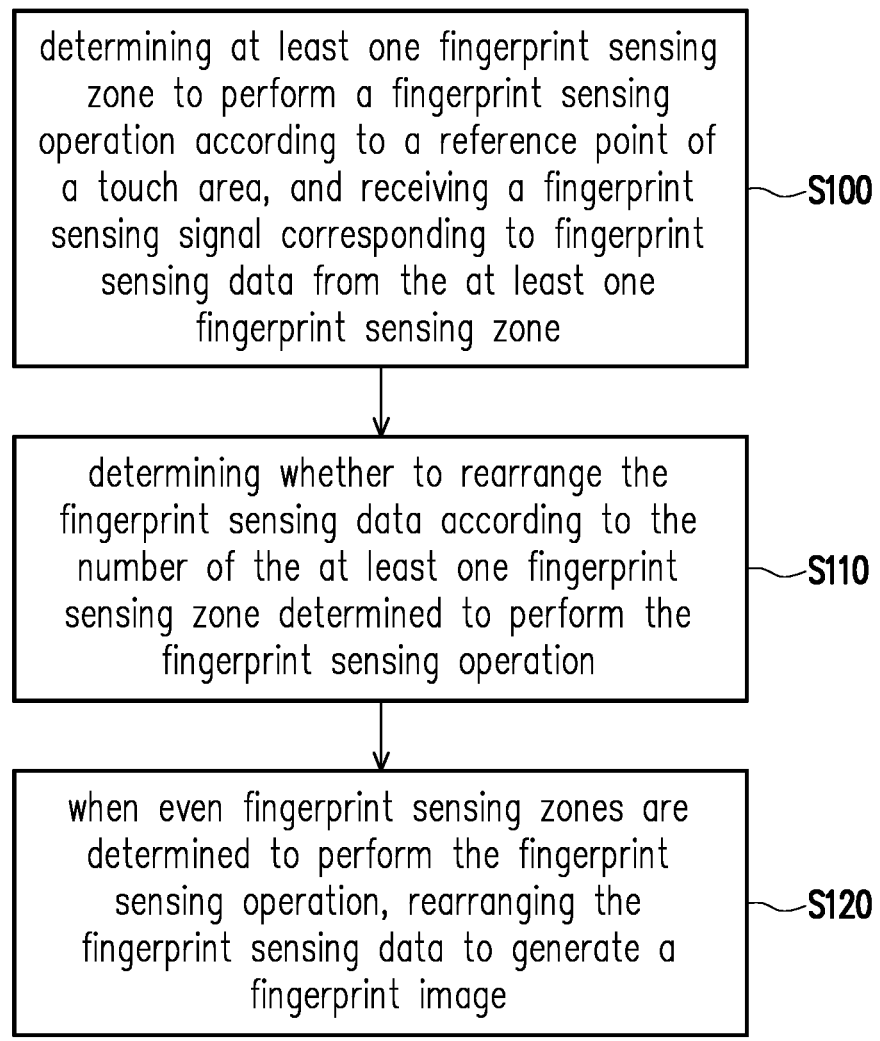
FIG. 20 is a flowchart illustrating detail steps in a method for sensing a fingerprint image according to an embodiment of the invention.

FIG. 20 is a flowchart illustrating detail steps in a method for sensing a fingerprint image according to an embodiment of the invention. Referring to FIG. 1 and FIG. 20, in the present embodiment, the method for sensing a fingerprint image is at least adapted to the electronic device 100 depicted in FIG. 4, but the invention is not limited thereto. Taking the electronic device 100 for example, in step S100, the electronic device 100 determines at least one of the fingerprint sensing zones 400 to perform a fingerprint sensing operation according to a reference point R of a touch area TSA, and receiving a fingerprint sensing signal S1 corresponding to fingerprint sensing data FPI_D from the at least one of the fingerprint sensing zones 400. In step S110, the electronic device 100 determines whether to rearrange the fingerprint sensing data FPI_D according to the number of the fingerprint sensing zones 400 determined to perform the fingerprint sensing operation. In step S120, the electronic device 100 rearranges the fingerprint sensing data FPI_D to generate the fingerprint image FPI_R when even fingerprint sensing zones of the fingerprint sensing zones 400 are determined to perform the fingerprint sensing operation. In an embodiment, the electronic device 100 does not rearrange the fingerprint sensing data FPI_D and generates the fingerprint image according to the received fingerprint sensing data FPI_D when odd fingerprint sensing zones of the fingerprint sensing zones 400 are determined to perform the fingerprint sensing operation.

The method for sensing a fingerprint image described of the embodiment of the invention is sufficiently taught, suggested, and embodied in the embodiments illustrated in FIG. 1 to FIG. 19, and therefore no further description is provided herein.

In summary, in the embodiments of the invention, the size of the fingerprint sensing zone can be determined according to user requirement. The fingerprint sensing circuit determines at least one fingerprint sensing zone to perform the fingerprint sensing operation according to the reference point of the touch area. The fingerprint sensing circuit further determines whether to rearrange the fingerprint sensing data according to the number of the determined fingerprint sensing zones. Therefore, the electronic device can provide an efficient method for fingerprint sensing and identification and good user experience for users. In addition, since the resolution of the touch sensors is substantially the same as the resolution of the fingerprint sensing zones in the display panel, the information of the reference point of the touch area reported to the fingerprint sensing circuit is more correct.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. An electronic circuit, adapted to drive a panel comprising a plurality of fingerprint sensing zones, the electronic circuit comprising:
    a fingerprint sensing circuit, configured to determine at least two adjacent fingerprint sensing zones to perform a fingerprint sensing operation according to a touch area and receive a fingerprint sensing signal corresponding to fingerprint sensing data from the at least two adjacent fingerprint sensing zones,
    wherein the fingerprint sensing circuit rearranges the fingerprint sensing data from the at least two adjacent fingerprint sensing zones.

2. The electronic circuit of claim 1, wherein the at least two adjacent fingerprint sensing zones comprise a first fingerprint sensing zone and a second fingerprint sensing zone, each of the first fingerprint sensing zone and the second fingerprint sensing zone comprises a plurality of fingerprint sensing columns, and
    the fingerprint sensing circuit receives the fingerprint sensing signal from a part of the fingerprint sensing columns of the first fingerprint sensing zone and a part of the fingerprint sensing columns of the second fingerprint sensing zone.

3. The electronic circuit of claim 2, wherein the fingerprint sensing circuit comprises a plurality of fingerprint sensing channels, the part of the fingerprint sensing columns of the first fingerprint sensing zone corresponds to a first number of the fingerprint sensing channels, the part of the fingerprint sensing columns of the second fingerprint sensing zone corresponds to a second number of the fingerprint sensing channels, and
    a summation of the first number and the second number is equal to a total number of the fingerprint sensing channels.

4. The electronic circuit of claim 1, wherein the at least two adjacent fingerprint sensing zones comprise a first fingerprint sensing zone, a second fingerprint sensing zone and a third fingerprint sensing zone, the third fingerprint sensing zone is located between the first fingerprint sensing zone and the second fingerprint sensing zone, each of the first fingerprint sensing zone, the second fingerprint sensing zone and the third fingerprint sensing zone comprises a plurality of fingerprint sensing columns, and
    the fingerprint sensing circuit receives the fingerprint sensing signal from all of the fingerprint sensing columns of the third fingerprint sensing zone.

5. The electronic circuit of claim 4, wherein the fingerprint sensing circuit comprises a plurality of fingerprint sensing channels, the all of the fingerprint sensing columns of the third fingerprint sensing zone corresponds to a third number of the fingerprint sensing channels, and
    the third number is equal to a total number of the fingerprint sensing channels.

6. The electronic circuit of claim 4, wherein the fingerprint sensing circuit receives the fingerprint sensing signal from a part of the fingerprint sensing columns of the first fingerprint sensing zone and a part of the fingerprint sensing columns of the second fingerprint sensing zone.

7. The electronic circuit of claim 6, wherein the fingerprint sensing circuit comprises a plurality of fingerprint sensing channels, the part of the fingerprint sensing columns of the first fingerprint sensing zone corresponds to a first number of the fingerprint sensing channels, the part of the fingerprint sensing columns of the second fingerprint sensing zone corresponds to a second number of the fingerprint sensing channels, and
    a summation of the first number and the second number is equal to a total number of the fingerprint sensing channels.

8. The electronic circuit of claim 1, wherein the fingerprint sensing circuit comprises:
    a digital circuit configured to output control signals;
    a converter circuit comprising a plurality of fingerprint sensing channels configured to receive the fingerprint sensing signal corresponding to the fingerprint sensing data; and
    a switch circuit controlled by the control signals and configured to receive the fingerprint sensing signal from the at least two adjacent fingerprint sensing zones determined to perform the fingerprint sensing operation and output the received fingerprint sensing signal to the converter circuit.

9. The electronic circuit of claim 1, further comprising:
    a touch sensing circuit, configured to receive touch sensing signals from the panel and determine the touch area according to the touch sensing signals.

10. The electronic circuit of claim 9, wherein the touch area overlaps with at least a portion of the at least two adjacent fingerprint sensing zones.

11. The electronic circuit of claim 1, wherein a size of the fingerprint sensing zone is determined according to a number of fingerprint sensing channels of the fingerprint sensing circuit.

12. The electronic circuit of claim 1, wherein the fingerprint sensing data corresponds to a fingerprint image, and the at least two adjacent fingerprint sensing zones are coupled to at least a portion of the fingerprint image, and the at least a portion of the fingerprint image comprises sufficient fingerprint features for fingerprint identification.

13. An electronic device, comprising:
    a panel, comprising a plurality of fingerprint sensing zones; and
    an electronic circuit, coupled to the panel and adapted to determine at least two adjacent fingerprint sensing zones to perform a fingerprint sensing operation according to a touch area and receive a fingerprint sensing signal corresponding to fingerprint sensing data from the at least two adjacent fingerprint sensing zones,
    wherein the electronic circuit rearranges the fingerprint sensing data from the at least two adjacent fingerprint sensing zones.

14. The electronic device of claim 13, wherein the at least two adjacent fingerprint sensing zones comprise a first fingerprint sensing zone and a second fingerprint sensing zone, each of the first fingerprint sensing zone and the second fingerprint sensing zone comprises a plurality of fingerprint sensing columns, and
    the electronic circuit receives the fingerprint sensing signal from a part of the fingerprint sensing columns of the first fingerprint sensing zone and a part of the fingerprint sensing columns of the second fingerprint sensing zone.

15. The electronic device of claim 14, wherein the electronic circuit comprises a plurality of fingerprint sensing channels, the part of the fingerprint sensing columns of the first fingerprint sensing zone corresponds to a first number of the fingerprint sensing channels, the part of the fingerprint sensing columns of the second fingerprint sensing zone corresponds to a second number of the fingerprint sensing channels, and a summation of the first number and the second number is equal to a total number of the fingerprint sensing channels.

16. The electronic device of claim 13, wherein the at least two adjacent fingerprint sensing zones comprise a first fingerprint sensing zone, a second fingerprint sensing zone and a third fingerprint sensing zone, the third fingerprint sensing zone is located between the first fingerprint sensing zone and the second fingerprint sensing zone, each of the first fingerprint sensing zone, the second fingerprint sensing zone and the third fingerprint sensing zone comprises a plurality of fingerprint sensing columns, and the electronic circuit receives the fingerprint sensing signal from all of the fingerprint sensing columns of the third fingerprint sensing zone.

17. The electronic device of claim 16, wherein the electronic circuit comprises a plurality of fingerprint sensing channels, the all of the fingerprint sensing columns of the third fingerprint sensing zone corresponds to a third number of the fingerprint sensing channels, and the third number is equal to a total number of the fingerprint sensing channels.

18. The electronic device of claim 16, wherein the electronic circuit receives the fingerprint sensing signal from a part of the fingerprint sensing columns of the first fingerprint sensing zone and a part of the fingerprint sensing columns of the second fingerprint sensing zone.

19. The electronic device of claim 18, wherein the electronic circuit comprises a plurality of fingerprint sensing channels, the part of the fingerprint sensing columns of the first fingerprint sensing zone corresponds to a first number of the fingerprint sensing channels, the part of the fingerprint sensing columns of the second fingerprint sensing zone corresponds to a second number of the fingerprint sensing channels, and a summation of the first number and the second number is equal to a total number of the fingerprint sensing channels.

20. The electronic device of claim 13, wherein the electronic circuit comprises:

a fingerprint sensing circuit, configured to determine the at least two adjacent fingerprint sensing zones to perform the fingerprint sensing operation according to the touch area and receive the fingerprint sensing signal corresponding to the fingerprint sensing data from the at least two adjacent fingerprint sensing zones, wherein the fingerprint sensing circuit rearranges the fingerprint sensing data from the at least two adjacent fingerprint sensing zones.

21. The electronic device of claim 20, wherein the fingerprint sensing circuit comprises:

a digital circuit configured to output control signals;

a converter circuit comprising a plurality of fingerprint sensing channels configured to receive the fingerprint sensing signal corresponding to the fingerprint sensing data; and a switch circuit controlled by the control signals and configured to receive the fingerprint sensing signal from the at least two adjacent fingerprint sensing zones determined to perform the fingerprint sensing operation and output the received fingerprint sensing signal to the converter circuit.

22. The electronic device of claim 20, wherein the electronic circuit further comprises:

a touch sensing circuit, configured to receive touch sensing signals from the panel and determine the touch area according to the touch sensing signals.

23. The electronic device of claim 22, wherein the touch area overlaps with at least a portion of the at least two adjacent fingerprint sensing zones.

24. The electronic device of claim 20, wherein a size of the fingerprint sensing zone is determined according to a number of fingerprint sensing channels of the fingerprint sensing circuit.

25. The electronic device of claim 13, wherein the fingerprint sensing data corresponds to a fingerprint image, and the at least two adjacent fingerprint sensing zones are coupled to at least a portion of the fingerprint image, and the at least a portion of the fingerprint image comprises sufficient fingerprint features for fingerprint identification.

26. The electronic device of claim 13, wherein the panel further comprises a plurality of fingerprint sensors and a plurality of touch sensors, each of the fingerprint sensing zones comprises plural fingerprint sensors, and a resolution of the touch sensors is substantially the same as a resolution of the fingerprint sensing zones.

27. The electronic device of claim 13, wherein the panel further comprises:

a switch circuit, configured to receive the fingerprint sensing signal from the at least two adjacent fingerprint sensing zones determined to perform the fingerprint sensing operation and output the received fingerprint sensing signal to the electronic circuit, wherein the electronic circuit outputs control signals to control an operation of the switch circuit.

28. A method for sensing a fingerprint image, adapted to a panel comprising a plurality of fingerprint sensing zones, the method comprising:

determining at least two adjacent fingerprint sensing zones to perform a fingerprint sensing operation according to a touch area, and receiving a fingerprint sensing signal corresponding to fingerprint sensing data from the at least two adjacent fingerprint sensing zones; and rearranging the fingerprint sensing data from the at least two adjacent fingerprint sensing zones.

\* \* \* \* \*